United States Patent [19]
Tokunaga et al.

[11] Patent Number: 5,140,358
[45] Date of Patent: Aug. 18, 1992

[54] CAMERA

[75] Inventors: Tatsuyuki Tokunaga, Kawasaki; Masayuki Suzuki, Yokohama, both of Japan

[73] Assignee: Canon Kabushiki Kaisha, Tokyo, Japan

[21] Appl. No.: 417,202

[22] Filed: Oct. 4, 1989

[30] Foreign Application Priority Data

Oct. 4, 1988 [JP] Japan .................. 63-251459
Oct. 4, 1988 [JP] Japan .................. 63-251461

[51] Int. Cl.[5] ........................................ G03B 13/00
[52] U.S. Cl. .................. 354/400; 354/453; 354/195.11
[58] Field of Search ............... 354/446–455, 354/400–409, 195.11

[56] References Cited

U.S. PATENT DOCUMENTS 3,842,587 10/1974 Strauss et al. .................. 354/440
4,657,368 4/1987 Kawamura .................. 354/452
4,723,139 2/1988 Ogasawara .................. 354/402

Primary Examiner—L. T. Hix
Assistant Examiner—David M. Gray
Attorney, Agent, or Firm—Fitzpatrick, Cella, Harper & Scinto

[57] ABSTRACT

A camera has a first photographing mode for also performing a second photographing operation at a focusing-lens position of a first photographing operation, a second photographing mode for performing autofocusing for every photographing operation, and diaphragm controller for controlling the amount of an aperture of a diaphragm. The diaphragm controller maintains the diaphragm in a state at the first photographing operation when the first photographing mode is selected, and returns the diaphragm to a predetermined position for every photographing operation when the second photographing mode is selected.

13 Claims, 22 Drawing Sheets

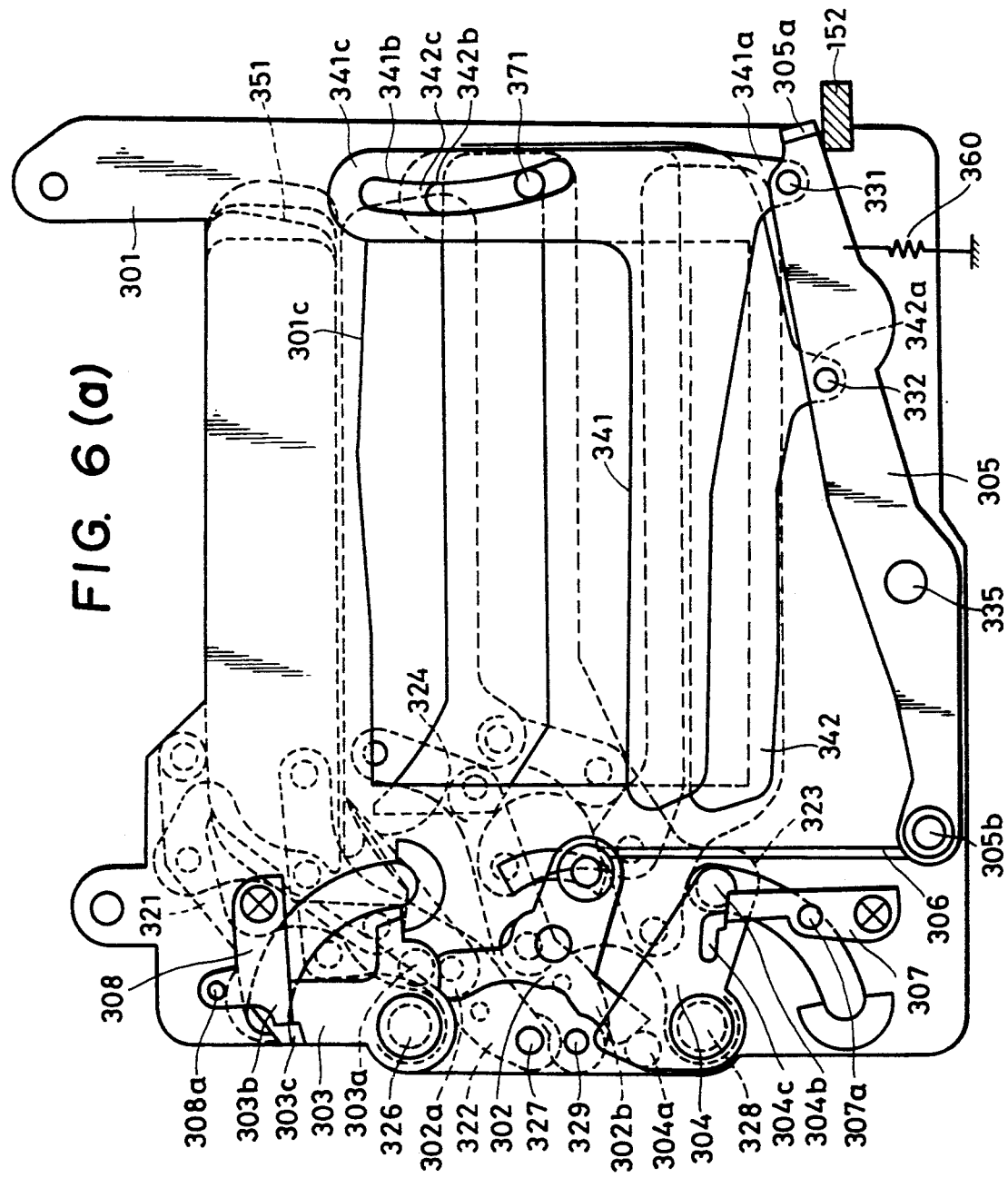

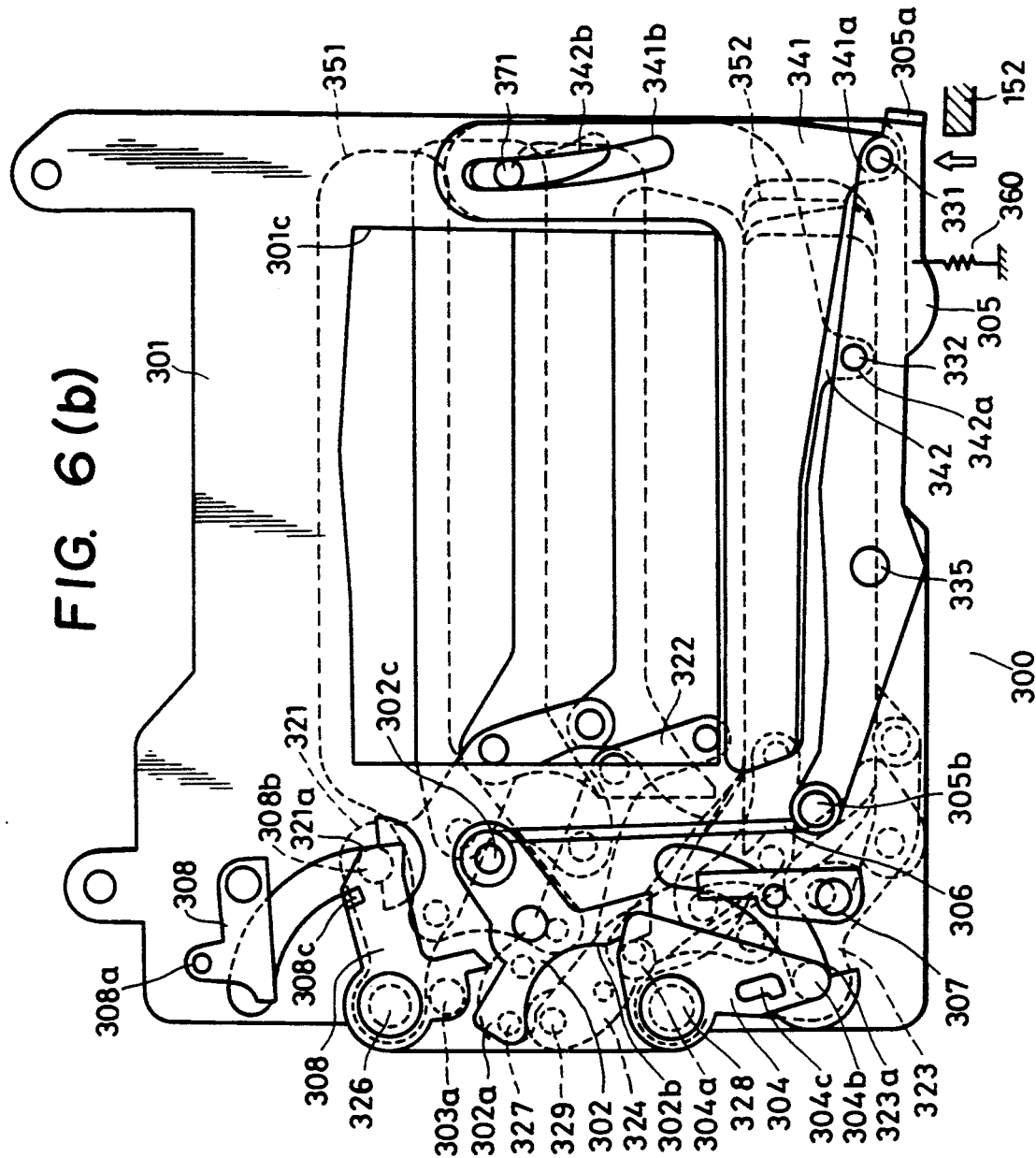

| FIG. 9A | FIG. 9B |

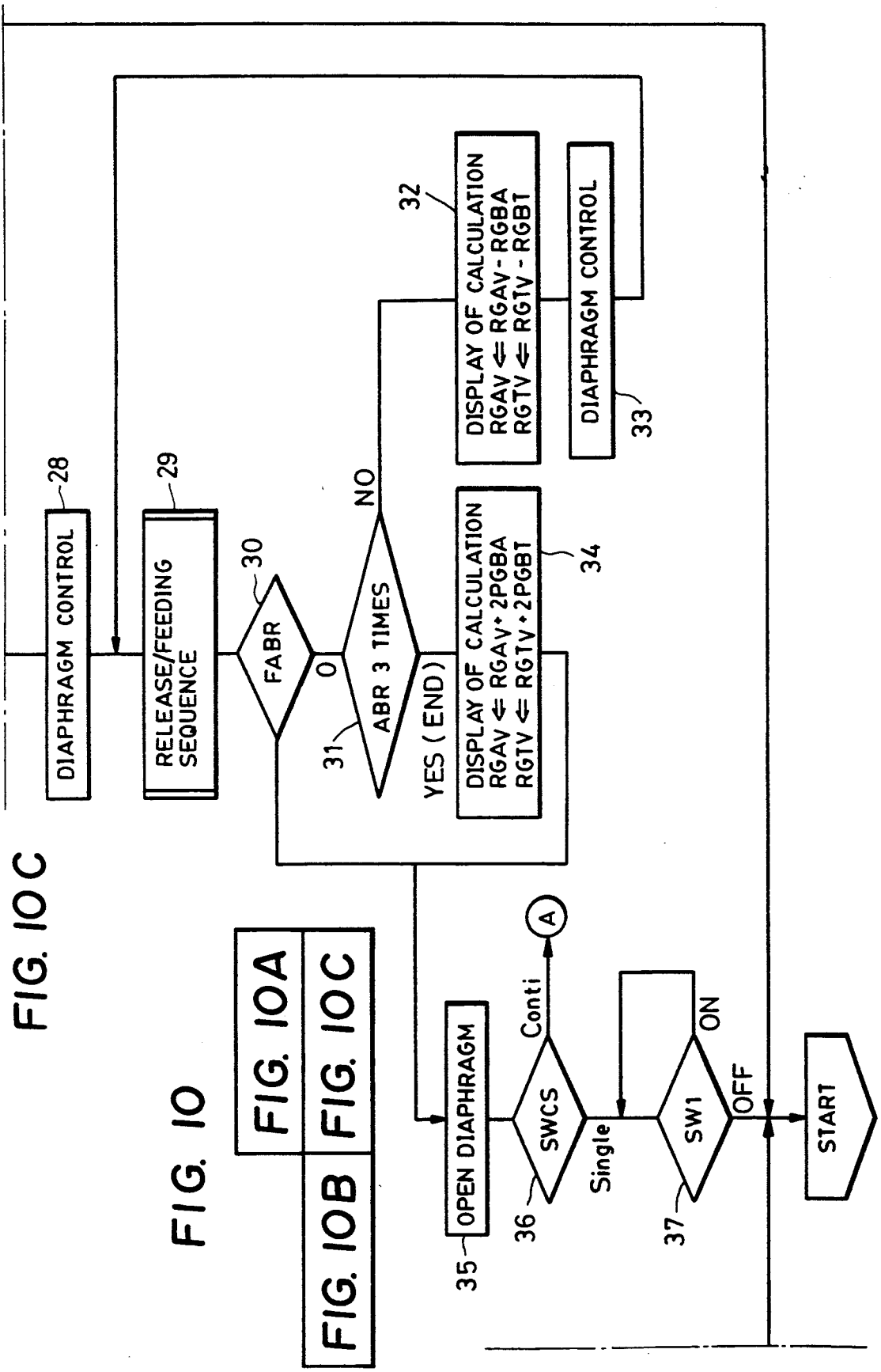

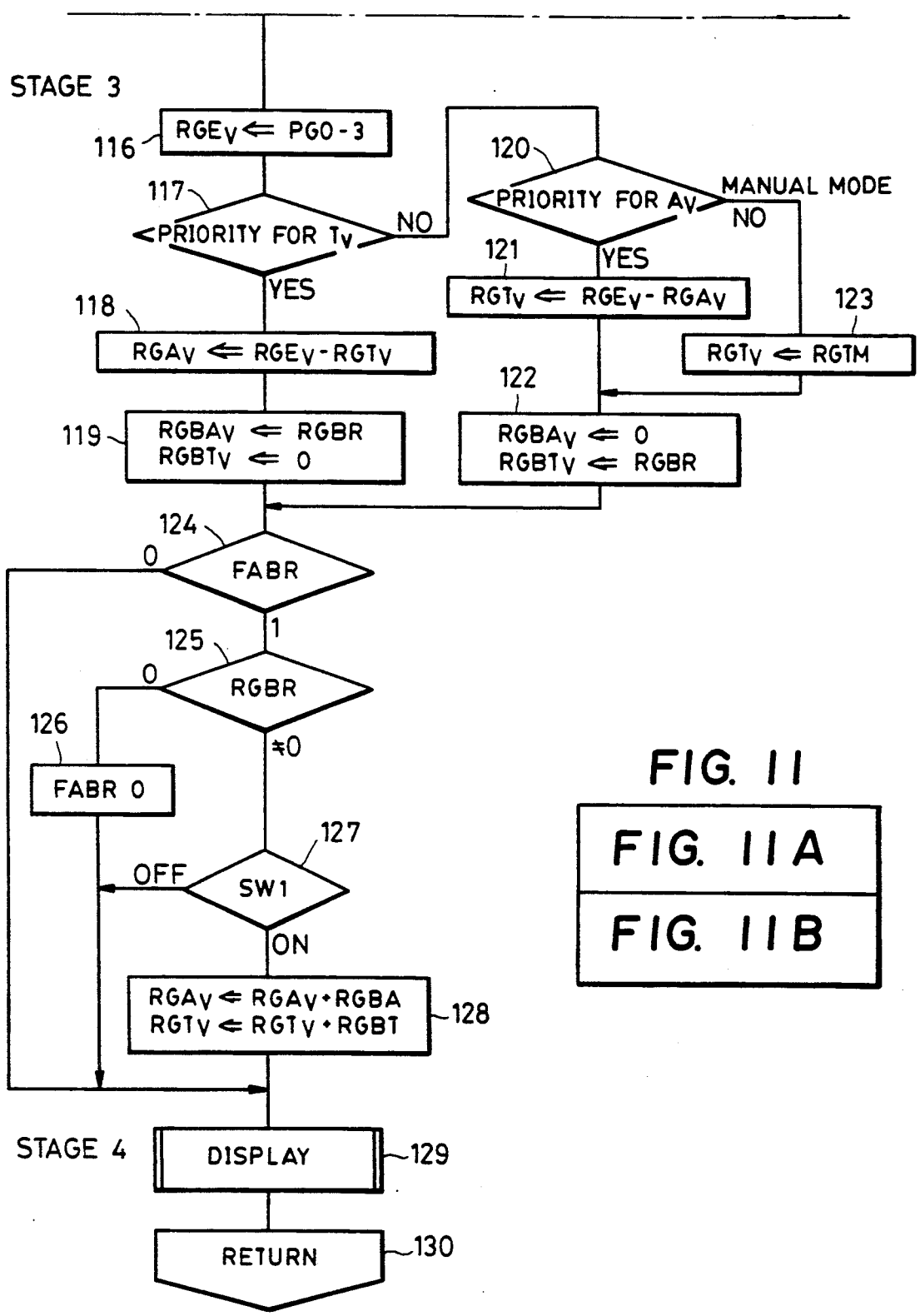

CAMERA

FIELD OF THE INVENTION

This invention relates to a camera which controls its diaphragm.

DESCRIPTION OF THE RELATED ART

Heretofore, in successive photographing operations in a single-lens reflex camera, a diaphragm of a photographing lens is returned to an open state and then moved to a predetermined stop value for every photographing operation. This operation is performed by maintaining a state in which the diaphragm of the photographing lens is mechanically charged by a spring and anchored in the open state, then releasing the anchorage in accordance with a shutter release, and controlling the diaphragm to move to a predetermined stop value. In the case of successive photographing operations, this operation is repeated even when the stop value after the second frame is identical to that for the first frame. Accordingly, time for returning the diaphragm of the photographing lens to the open state and time for controlling the diaphragm to move to a predetermined stop value are required. Hence, the successive photographing frame speed in successive photographing operations can not become high, and power is wastefully consumed because energy is needed for charging and controlling the diaphragm. These facts are very inconvenient in a single-lens reflex camera, particularly in an AF (autofocusing) camera, for which a small size is required, because a considerable amount of electric power is needed for operating AF functions.

SUMMARY OF THE INVENTION

According to one aspect of the present invention, there is provided a camera with increased operating speed and which minimizes wasteful electric power consumption in successive photographing operations by changing the method of controlling a diaphragm in accordance with execution and nonexecution of autofocusing in a successive photographing mode.

According to another aspect of the present invention, there is provided a camera which shortens a time required for the preparation of a photographing operation between successive frames and minimizes wasteful electric power consumption by properly using a method in which diaphragm control is returned from a stopped state to an open state for every photographing operation and a method in which photographing operation for the next frame is performed only by shifting from a stopped state to another stopped state.

According to a further aspect of the invention a camera comprises a first photographing mode for performing a second photographing operation at a focused-lens position used for a photographing operation, a second photographing mode for performing autofocusing for every photographing operation, and a diaphragm control means for controlling the amount of an aperture of a diaphragm, wherein the diaphragm control means maintains the diaphragm in a state at the first photographing operation when the first photographing mode is selected, and returns the diaphragm to a predetermined position for every photographing operation when the second photographing mode is selected.

According to yet another aspect of the invention a camera as described in the preceding paragraph includes an interchangeable lens incorporating the diaphragm.

According to a further aspect of the invention a camera comprises a specific photographing mode for performing plural photographic operations by shifting a stop value of a diaphragm by a predetermined amount, and a diaphragm control means for driving a diaphragm by a difference from a shift of the diaphragm at the preceding photographing operation, when the specific photographing mode has been selected.

According to another aspect of the invention a camera as described in the preceding paragraph includes a detachably mounted interchangeable lens.

BRIEF DESCRIPTION OF THE DRAWINGS

FIGS. 6(a) and 6(b) are diagrams of the configuration of the principal part of a shutter unit;

DETAILED DESCRIPTION OF THE PREFERRED EMBODIMENTS

A first embodiment of the present invention will be hereinafter explained with reference to the drawings. The present embodiment represents a case in which the present invention is applied to a single-lens reflex camera.

Figure 1:
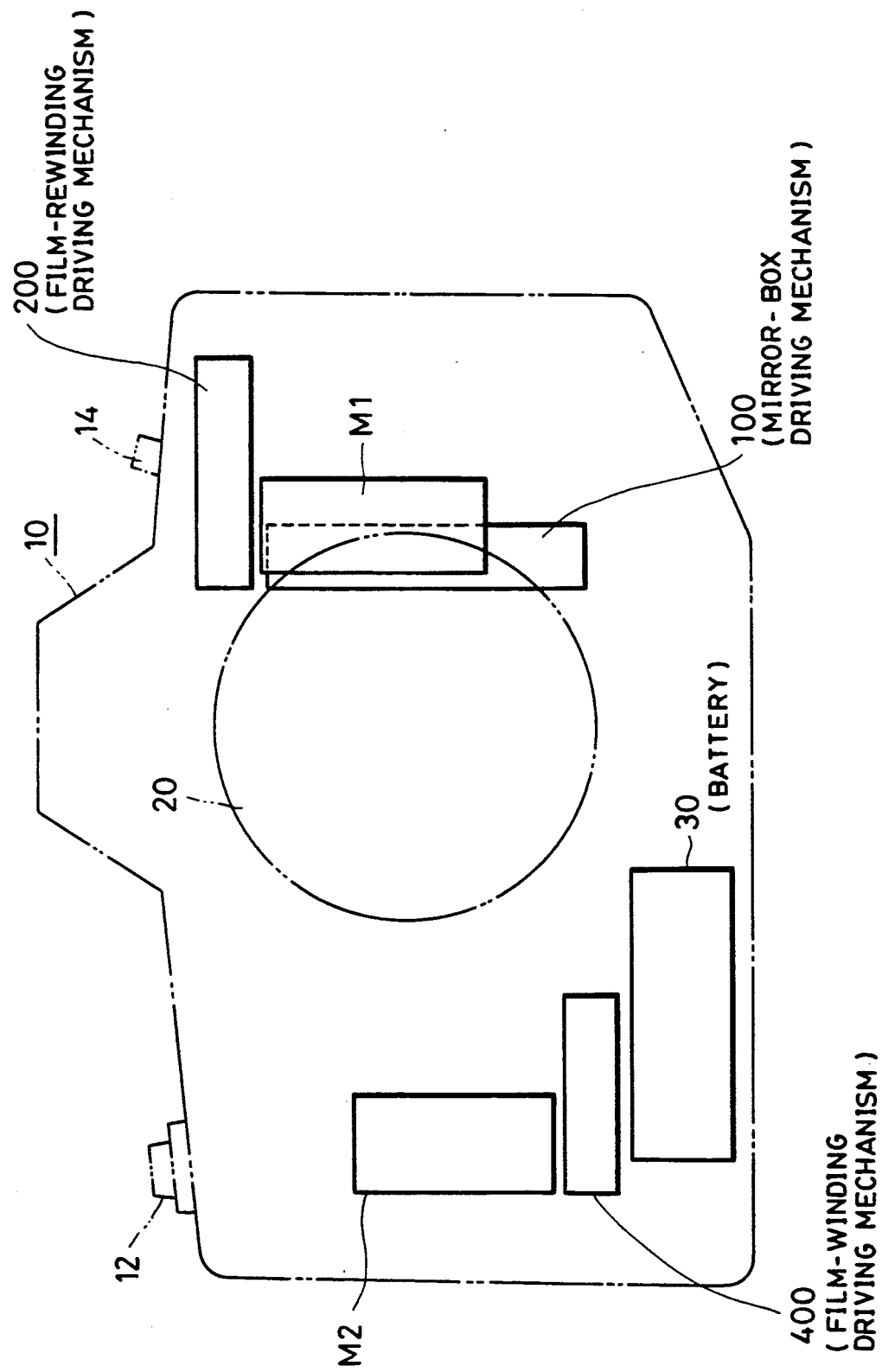
FIG. 1 is a schematic diagram of the disposition of each configuration in an electrically-driven camera as an embodiment of the present invention.

FIG. 1 shows the disposition of each unit in a single-lens reflex camera. A removable photographing lens 20 is mounted to a camera body 10. There are also shown a shutter-release button 12, a button 14 for rewinding, and a battery 30 disposed at a base position of the camera body 10. Naturally, in order to easily replace the battery 30, the camera body 10 has a structure capable of easily removing out the battery 30 from a battery receptacle by removing a member corresponding to a battery lid. A first motor M1 is a driving source for the charging of a front-plate system and a shutter system, and the driving of a submirror and a film-rewinding system. There are also shown a driving mechanism 100 for a mirror box as the front-plate system, a driving mechanism 200 for film rewinding, and a driving mechanism 400 for film winding. A second motor M2 is a driving source for the film-winding driving mechanism 400.

Figure 2:
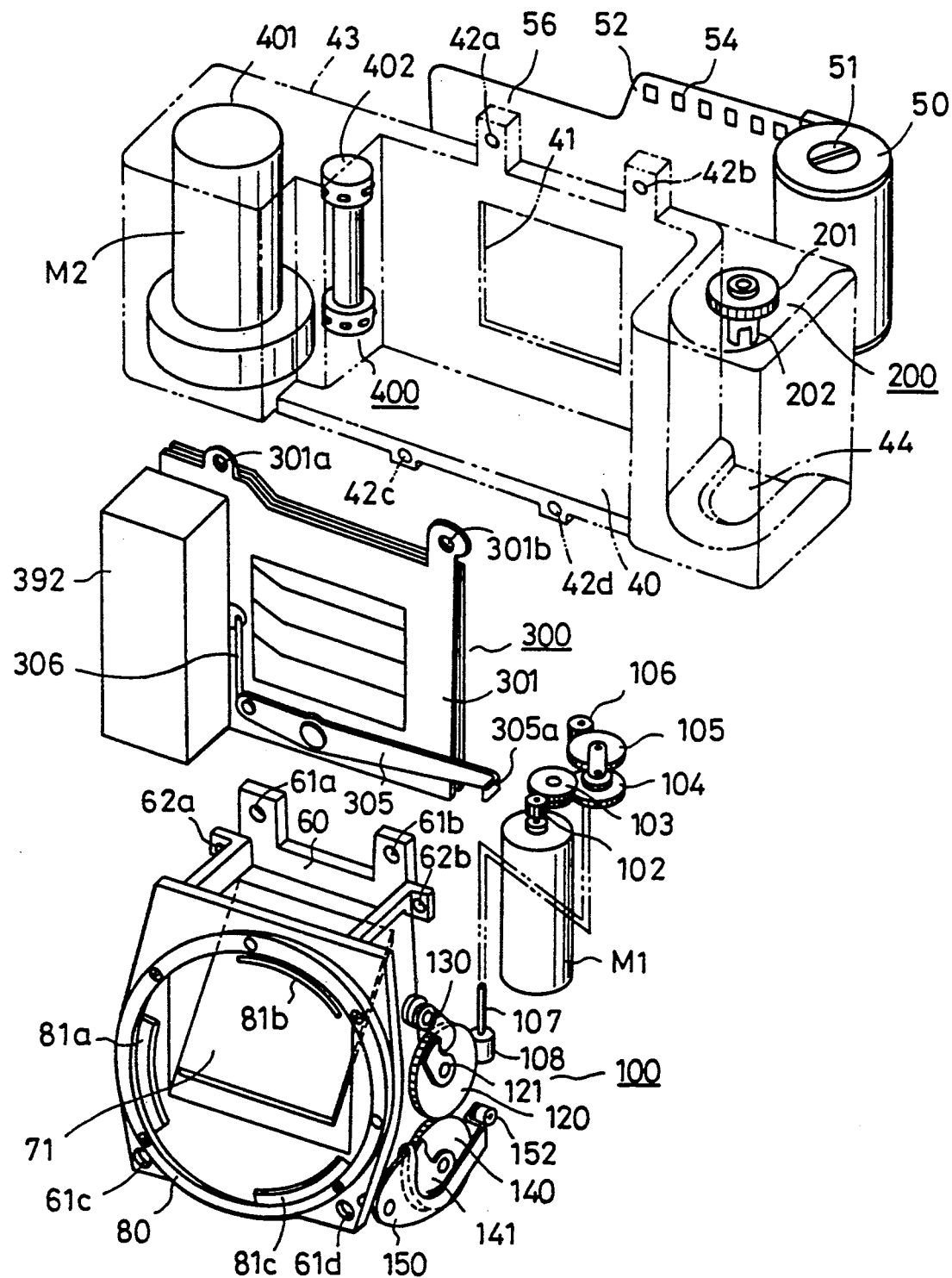
FIG. 2 is an exploded perspective view of the principal parts of each configuration in FIG. 1.

FIG. 2 shows exploded perspective views of the configuration of each unit shown in FIG. 1.

Now, according to the configurational diagram of each unit in FIG. 2, the configuration and operation of each unit will be explained. First, an outline of each unit will be explained.

In FIG. 2, although a detailed illustration is omitted, a main body 40 of the camera is entirely formed by plastic molding. However, portions particularly requiring accuracy and strength, such as the region of an aperture 41 and the like, are formed by a metal insert. There are also shown mounting holes 42a–42d for fixing a mirror box 60, which will be described later, with screws, a spool chamber 43 and a film-magazine chamber 44. A film 52, which has film perforations 54 and a film leader portion 56, is rolled in a film magazine 50. In the mirror box 60, mounting holes 61a–61d are formed at positions corresponding to the mounting holes 42a–42d in the main body 40 of the camera, respectively. The mirror box 60 is firmly fixed to the main body 40 of the camera with screws through the adjustable mounting holes 42a–42d and through the mounting holes 61a–61d. A fixed mirror 71, in which a thin film is stretched, has been subjected to vacuum-deposition processing so that light passing through the lens is divided with a predetermined ratio to a finder optical system (not illustrated) and a photographing system for exposing the film 52 via a shutter unit 300 and the aperture 41. In a camera-side mount 80 fixed by screws to the mirror box 60, there are formed bayonet clicks 81a–81c for performing bayonet coupling with a lens-side mount (not illustrated) of the photographing lens 20.

The entire mirror-box driving mechanism 100 is disposed at the mirror box 60. A part of the entire film-rewinding driving mechanism 200 is disposed at the mirror box 60, and another part is disposed at the side of the main body 40 of the camera. The first motor M1, which is the driving source for the above-described two mechanisms 100 and 200, is fixed at the mirror box 60. In a base plate 301 for a shutter in the entire shutter unit 300, there are formed mounting holes 301a and 301b for performing mounting to the mirror box 60. Accordingly, the shutter unit 300 is firmly fixed to the mirror box 60 with screws through the adjustable mounting holes 301a and 301b and through the corresponding mounting holes 62a and 62b of the mirror box 60. Although not depicted in detail in FIG. 2, the entire film-winding driving mechanism 400 is provided as a unit, and is incorporated at the position of the spool chamber 43 of the main body 40 of the camera.

Next, the configuration of the mirror-box driving mechanism 100 will be explained in detail with reference to the above-described FIG. 2 and FIGS. 3–5.

A base plate 101 fixed to one side (the right side in FIG. 2) of the mirror box 60 rotatably supports all rotating gears of the mirror-box driving mechanism 100. There are shown an output gear 102 of the first motor M1, a reduction gear 103 meshing with the output gear 102, a sun gear 104 meshing with the reduction gear 103, and a planet gear 105 meshing with the sun gear 104. The sun gear 104 and the planet gear 105 are coupled together by a planet lever 112, and it is configured so that the planet gear 105 performs a sun-and-planet motion in accordance with the direction of the rotation of the sun gear 104. That is, the planet gear 105 is subjected to friction coupling with a planet shaft 110 as the central shaft by a coil spring 111. Furthermore, a cradle 113 idly fitted to a boss 114 of the base plate 101 which becomes the central shaft of the sun gear 104 and the planet shaft 110 are coupled together by the planet lever 112. Accordingly, as can be understood with reference to the operation diagram in FIG. 5(a), at the counterclockwise rotation of the sun gear 104, the planet gear 105 first revolves in the counterclockwise direction by the friction of the coil spring 111, and meshes with a transmission gear 106. When the planet gear 105 meshes with the transmission gear 106, the driving force overcomes the friction of the coil spring 111 (the planet gear 105 performs slip rotation relative to the planet shaft 110). Hence, the planet gear 105 rotates by itself (rotation in the clockwise direction), and transmits the rotation of the first motor M1 to the transmission gear 106.

On the other hand, as can be understood with reference to the operation diagram in FIG. 5(b), at the clockwise rotation of the sun gear 104, the planet gear 105 first rotates in the clockwise direction, moves toward a rewind gear 201 as a rewinding transmission system, which will be described later, with making the boss 114 as the center of rotation, and meshes with the rewind gear 201. When the planet gear 105 meshes with the rewind gear 201, the planet gear 105 rotates by itself and transmits the rotation of the first motor M1 to the rewind gear 201.

The transmission gear 106 which rotates in the counterclockwise direction is the motive side of the mirror-box driving system. One end of a transmission shaft 107 is fixed to the transmission gear 106, and at another end, a worm gear 108 is fixed. The movement of the transmission shaft 107 in thrust directions is regulated by cradles 115 of the base plate 101 disposed at positions in two thrust directions of the worm gear 108.

On the surface side of a submirror-driving gear 120, which meshes with the worm gear 108 and rotates in the clockwise direction, a submirror-driving cam 121 is formed as one body, and on the back side, a brush 122 for position detection (formed by a conductive material) is fixed. The submirror-driving gear 120 is rotatably supported by a boss 116 of the base plate 101. At the submirror-driving cam 121, there are formed an up cam surface 121a for driving a mirror driving lever 130, which will be described later, in the counterclockwise direction, a flat cam surface 121b for maintaining the rotation position (a state in which the mirror is depressed) of the driving lever 130, and a down cam surface 121c for allowing the rotation of the driving lever 130 in the clockwise direction.

The submirror-driving lever 130 consisting of two levers fixed nearly in an L-like shape is rotatably supported by a boss 117 of the base plate 101, and has a role of a cam follower of the submirror-driving cam 121. That is, the submirror-driving lever 130 receives rotation driving in the counterclockwise direction by the sliding contact of its end portion 131 with the up cam surface 121a of the submirror-driving cam 121. This action maintains the rotation state in the counterclockwise direction by the sliding contact with the flat cam surface 121b, and its rotation (return) in the clockwise direction is allowed by the sliding contact with the down cam surface 121c (even when not actually performing sliding contact, it is only necessary that the end portion 131 corresponds to the down cam surface 121c in position). By receiving a control corresponding to the rotation position of each cam surface of the submirror-driving cam 121, another end portion 132 of the submirror-driving lever 130 performs mirror-depressing (rotation toward a position for retreating from exposure) operation of a submirror 70 by pushing a mirror pin 74, which will be described later, maintenance of the depressed state of the mirror by continuing the pushing of the mirror pin 74, and allows raising of the mirror (return by rotation toward an AF distance-measurement position) by releasing the pushing of the mirror pin 74.

At the surface side of a shutter-charging gear 140 which meshes with the mirror driving gear 120 and rotates in the counterclockwise direction, a shutter-charging cam 141 is formed as one body. The shutter-charging gear 140 has a 1:1 transmission ratio (i.e. its reduction ratio is 1.0) with the mirror-driving gear 120, and is rotatably supported by a boss 118 of the base plate 101. At the shutter-charging cam 141, there are formed an up cam surface 141a for driving a shutter-charging lever 150, which will be described later, in the counterclockwise direction, a flat cam surface 141b for maintaining the rotation position (charging state) of the shutter-charging lever 150, and a down cam surface 141c for allowing the rotation (the release of charging) of the charging lever 150 in the clockwise direction.

The shutter-charging lever 150 formed nearly in an L-like shape is rotatably supported by a boss 119 of the base plate 101, and has a role as a cam follower of the shutter-charging cam 141. That is, the shutter-charging lever 150 is rotatably driven in the counterclockwise direction by the contact of the roller 151 supported at one end portion thereof with the up cam surface 141a of the shutter cam 141, and maintains the rotation state in the counterclockwise direction by the contact with the flat cam surface 141b. Its rotation in the clockwise direction is allowed by the arrival of the roller 151 at the phase of the down cam surface 141c. By receiving a control corresponding to the rotation position of each cam surface of the shutter-charging cam 141, a roller 152 supported at another end portion of the shutter charging lever 150 pushes one end 305a of a seesaw lever 305 in the shutter unit 300, which will be described later, to perform a charging operation of the shutter, maintains the charging operation by continuing the pushing of the seesaw lever 305 (the shutter unit 300 in the present embodiment can continue the charging operation by mechanically supporting both first and second screens of the shutter at a preparatory position for running), and allows the seesaw lever 305 to return by releasing the pushing of the seesaw lever 305 (by releasing the mechanical support of the first and second screens of the shutter at the preparatory position for running, running of the shutter becomes possible by the control of current supply for an electromagnet for control).

Figure 3:
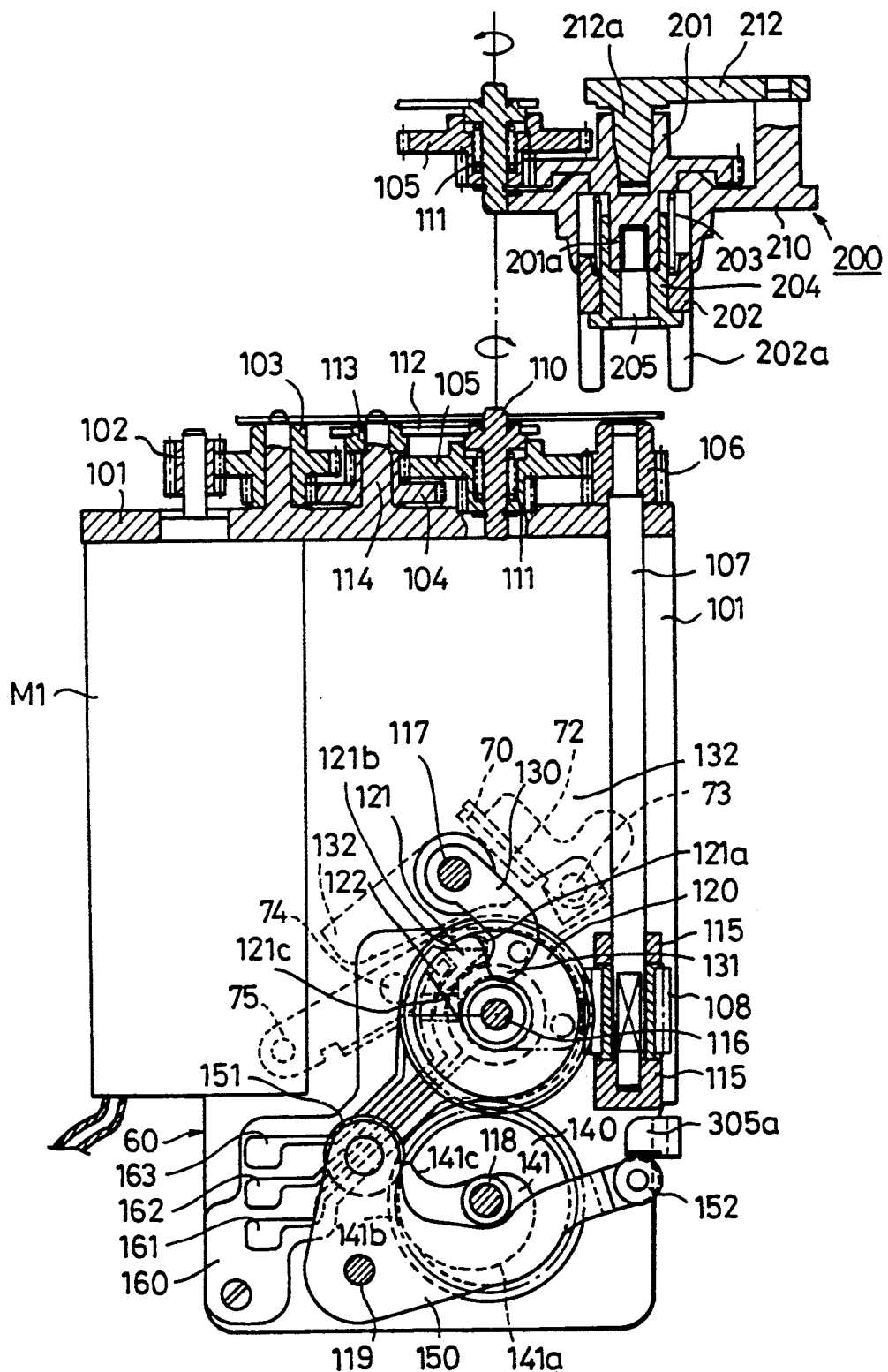
FIGS. 3(a) and 3(b) are diagrams of the operations of a mirror-box driving mechanism and a film-rewinding driving mechanism shown in FIG. 2, respectively.
Figure 3B:
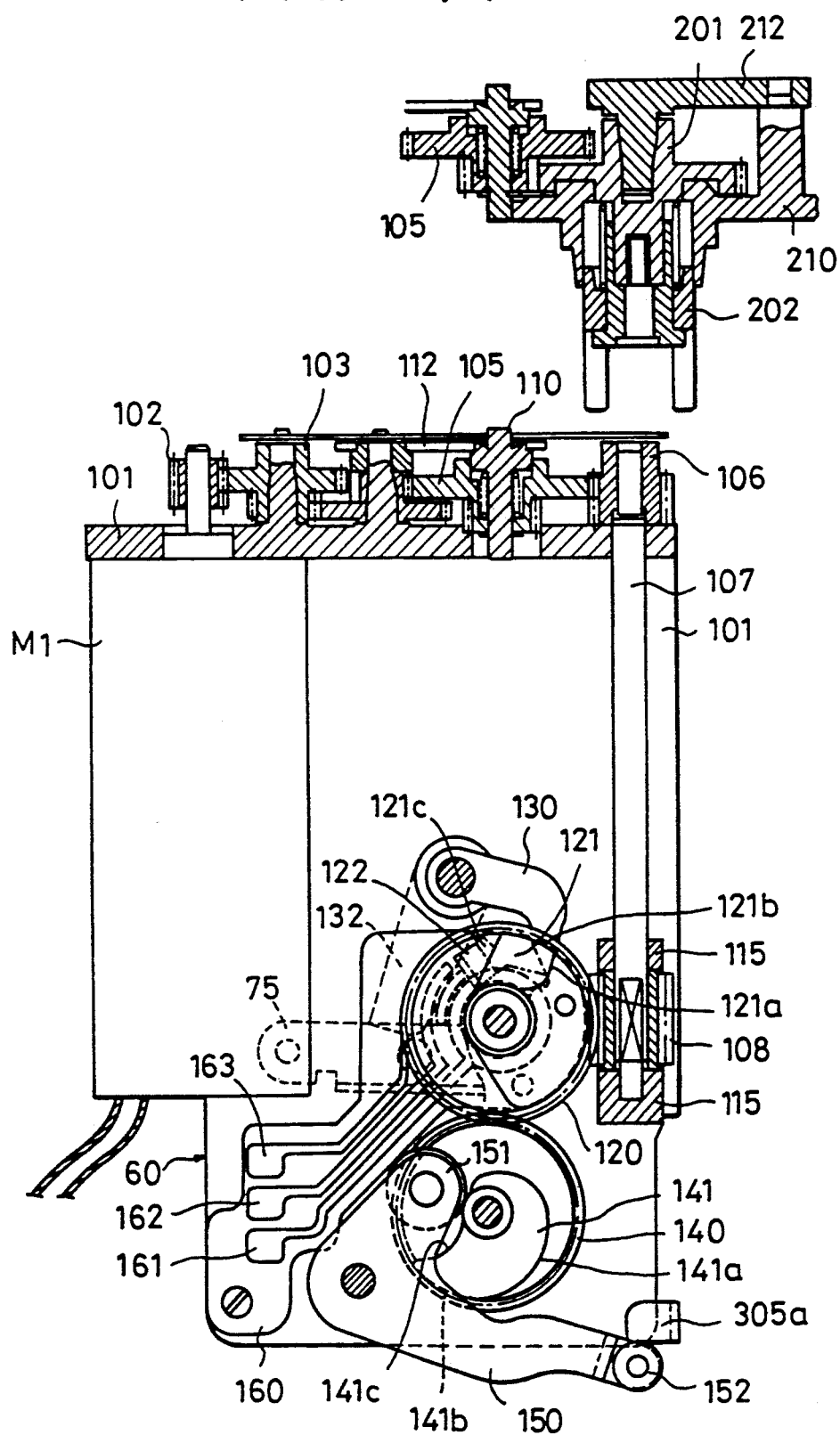

As can be easily understood by performing a comparative analysis of FIGS. 3(a) and 3(b), the mirror-depressing driving phase of the submirror-driving mirror 130 by the submirror-driving cam 121 and the charging driving phase of the seesaw lever 305 by the shutter charging cam 141 are set to be completely shifted from each other. That is, as shown in FIG. 3(a), when the seesaw lever 305 is charged and pushed by the shutter-charging cam 141, the mirror-driving cam 121 does not push the submirror-driving lever 130, and the movable mirror 70 is in a raised state (an AF distance-measurement position). As shown in FIG. 3(b), when the mirror-driving cam 121 pushes the mirror-driving lever 130 to move the movable mirror 70 in a depressed state (a position for retreating from exposure), the shutter-charging cam 141 does not push the seesaw lever 305. Hence, the charging of the shutter unit 300 is released, and the mechanical support of the first and second screens of the shutter at the preparatory position for shutter running is also released.

A signal substrate 160 is fixed by screws at the base plate 101. On the signal substrate 160, there are formed three patterns for position detection, that is, a ground pattern 161, a pattern 162 for detecting the completion of operation, and a pattern 163 for detecting overrun, by means of vacuum deposition and the like. A relationship between these patterns 161–163 and a brush 122 fixed at the back surface of the above-described sub-mirror-driving gear 120 will be explained with reference to FIGS. 4(a) and 4(b).

A sliding member 122a of the brush 122 is divided into a comb-like shape to increase reliability in the contact with respective patterns 161–163 on the signal substrate 160. The actual sliding position, that is, the contact point, in the sliding member 122a is on a line 122b which is situated a little toward the inner side relative to the front end of the brush.

Figure 4A:
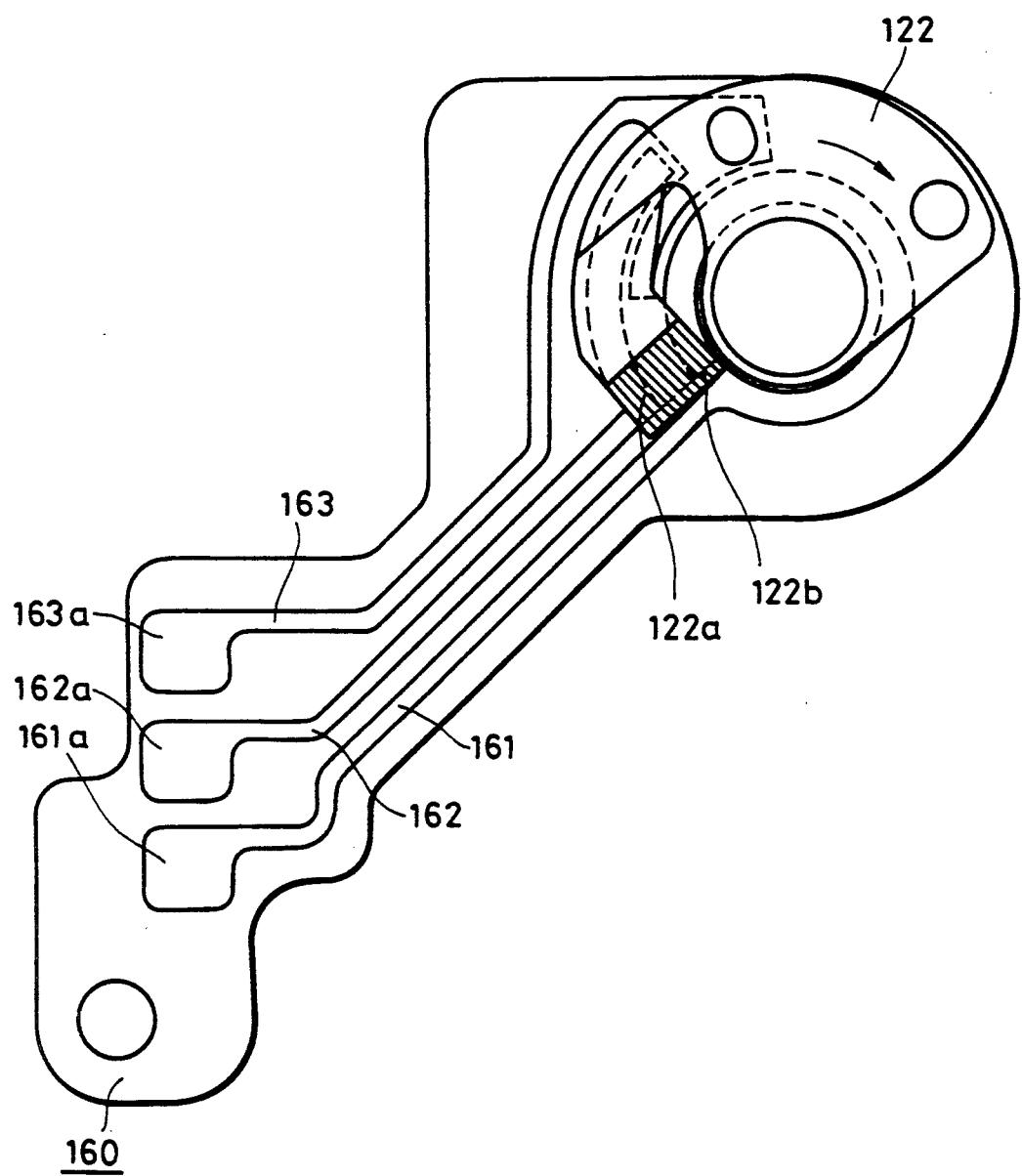
FIGS. 4(a) and 4(b) are diagrams of the operation of only phase-detection configurations shown in FIGS. 3(a) and 3(b), respectively.

FIG. 4(a) shows a phase of detecting the completion of shutter charging which corresponds to the above-described FIG. 3(a). In FIG. 4(a), the brush 122 rotates in the clockwise direction as shown by an arrow in accordance with the rotation of the mirror-driving gear 120 in the clockwise direction. The sliding member 122a contacts both the ground pattern 161 and the pattern 162 for detecting the completion of operation in the state of FIG. 4(a), and the completion of shutter charging is detected by the fact that the potential of a connector member (land member) 162a of the detection pattern 162 changes to ground level. The detection will be hereinafter explained in a little more detail. A ground level signal at a camera control circuit, which will be described later, is supplied to a connector member (land member) 161a of the ground pattern 161. On the other hand, the output of the connector member 162a of the pattern 162 for detecting the completion of operation is supplied to the camera control circuit (an input port P11). When the brush 122 is at a preceding position of the state in FIG. 4(a) (the situation may be understood by moving the brush 122 to a position obtained by rotating it in the counterclockwise direction from the position in FIG. 4(a)), the sliding member 122a of the brush 122 contacts only the ground pattern 161, and the potential of the detection pattern 162 does not yet change to ground level. When the mirror-driving gear 120 further rotates in the clockwise direction from this position, and the brush 122 also rotates in the clockwise direction and arrives at the position in FIG. 4(a), the brush 122 (the conductive material) contacts the pattern 162 for detecting the completion of operation as well. Hence, the potential of the pattern 162 for detecting the completion of operation changes to ground level via the brush 122, and the above-described camera control circuit detects the state of the completion of shutter charging and performs stop control of the rotation driving of the above-described first motor M1. The position of the brush 122 in FIG. 4(a) and the position of the brush 122 in FIG. 3(a) are different from each other, because, although the first motor M1 is subjected to stop control (braking) at the position in FIG. 4(a), the first motor M1 cannot instantaneously stop, and a little overrun is therefore produced. FIG. 3(a) shows the stop position of the first motor M1 when the overrun is produced. However, for the purpose of explanation, the stop position of the submirror-driving gear 120 (the brush 122) in FIG. 3(a) shows a state in which the overrun is at maximum from calculation. Actually, the submirror-driving gear 120 can stop with a somewhat smaller amount of overrun. As is apparent from FIG. 3(a), in order to deal with the overrun of the first motor M1, a flat cam surface 141b for continuing the state of the completion of shutter charging is formed at the shutter charging cam 141.

Figure 4B:
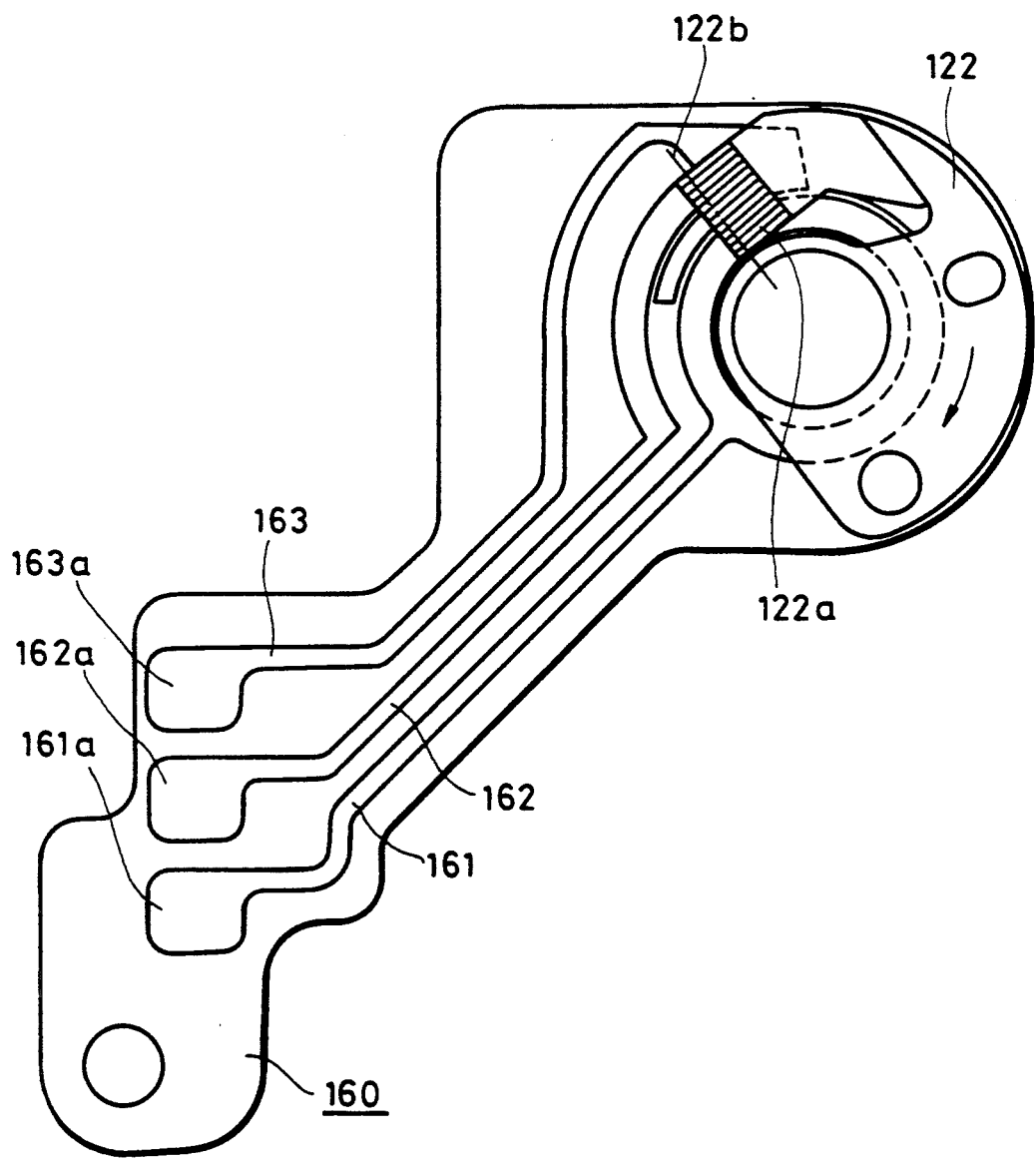
Figure 5:
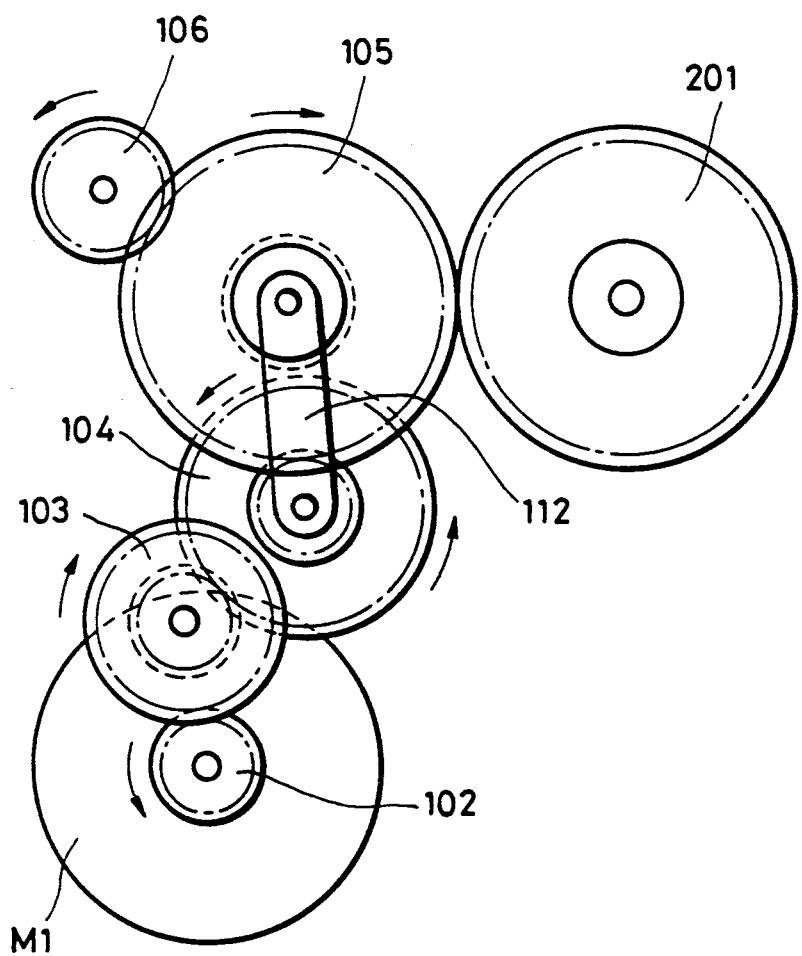
FIGS. 5(a) and 5(b) are diagrams of the operation of transmission-switching configurations in FIGS. 3(a) and 3(b), respectively.
Figure 5:
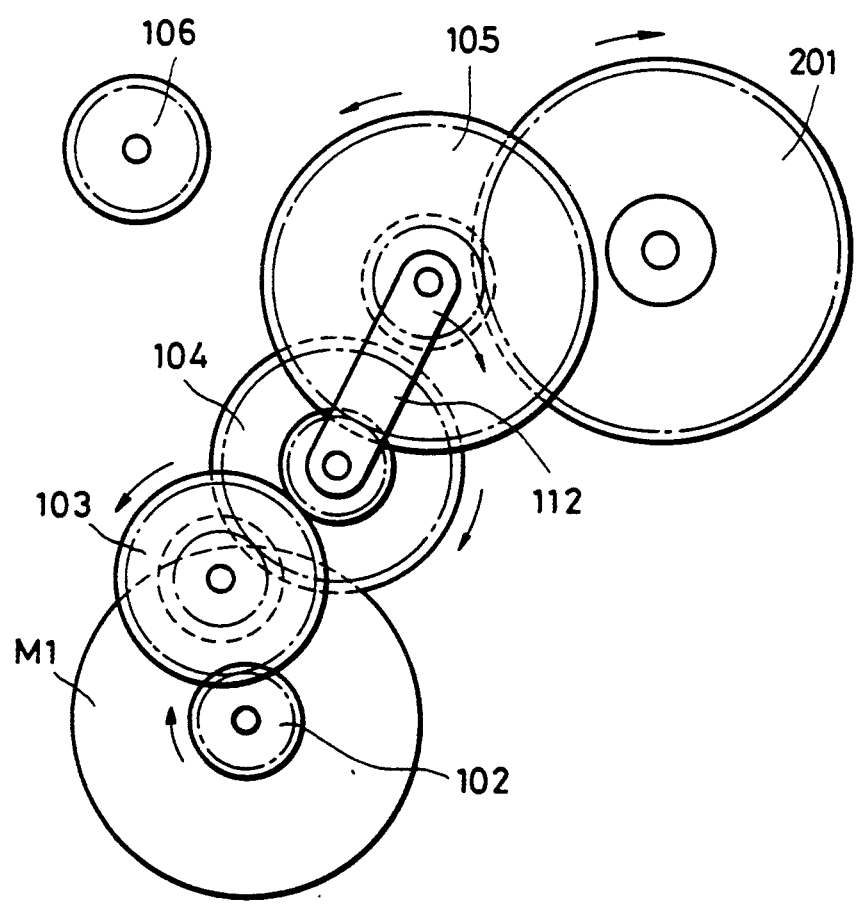

On the other hand, FIG. 4(b) shows a phase of detecting the completion of depressing the mirror which corresponds to the above-described FIG. 3(b). In FIG. 4(b), the brush 122 rotates in the clockwise direction from the state illustrated in FIG. 4(a) as depicted by an arrow in accordance with the clockwise rotation of the mirror-driving gear 120. In the state in FIG. 4(b), the sliding member 122a switches from the state of contacting both the ground pattern 161 and the pattern 162 for detecting the completion of operation to a state of not contacting the detection pattern 162. The completion of depressing the mirror is detected by the change of the potential of the connector member (land member) 162a of the detection pattern 162 from the ground level to an initial level (usually H level). The detection will be hereinafter explained in further detail. When the brush 122 is at a preceding position of the state in FIG. 4(b) (the situation can be understood by moving the brush 122 from the position in FIG. 4(b) to a position obtained by rotating it in the counterclockwise direction), the sliding member 122a of the brush 122 contacts both the ground pattern 161 and the pattern 162 for detecting the completion of operation, and the output of the connector member 162a of the pattern 162 for detecting the completion of operation still supplies a ground level signal for the camera control circuit. When the submirror-driving gear 120 further rotates in the clockwise direction, and the brush 122 also rotates in the clockwise direction and arrives at the position in FIG. 4(b), the brush 122 shifts to a state of not contacting the pattern 162 for detecting the completion of operation. Hence, the potential of the pattern 162 for detecting the completion of operation changes from ground level to an initial level, and the above-described camera control circuit detects the state of the completion of depressing the mirror and performs stop control of the rotation driving of the above-described first motor M1. The position of the brush 122 in FIG. 4(b) and the position of the brush 122 in FIG. 3(b) are different from each other, because, although the first motor M1 is subjected to stop control (braking) at the position in FIG. 4(b), the first motor M1 can not instantaneously stop, and a little overrun is therefore produced. FIG. 3(b) shows the stop position when the overrun of the first motor M1 is produced. However, for the purpose of explanation, the stop position of the submirror-driving gear 120 (the brush 122) in FIG. 3(b) shows a state in which the overrun is at maximum from calculation. Actually, the mirror-driving gear 120 can stop with a somewhat smaller amount of overrun. As is apparent from FIG. 3(b), in order to deal with the overrun of the first motor M1, a flat cam surface 121b for continuing the state of the completion of raising the mirror is formed at the mirror-driving cam 121. Now, a further general explanation will be provided relative to the relationship between the above-described shutter charging and depressing of the mirror. First of all, it is important that all operations, that is, shutter charging and depressing of the mirror, and release of the shutter charging and permission of rasing the mirror, are performed by the rotation of the first motor M1 in an identical direction. That is, all the operations are performed in a state in which, by the rotation of the first motor M1 in the counterclockwise direction (the rotation of the output gear 102 in the counterclockwise direction), the planet gear 105 rotates in the counterclockwise direction and meshes with the transmission gear 106 as shown in FIG. 5(a). The rotation force of the first motor M1 rotates the submirror-driving gear 120 in the clockwise direction, and rotates the shutter-charging gear 140 in the counterclockwise direction. Furthermore, when the submirror-driving cam 121 of the mirror-driving gear 120 is at a position for permitting raising of the mirror (FIG. 3(a)), the shutter-charging cam 141 of the the shutter-charging gear 140 is at a position for performing shutter charging (FIG. 3(a)). When the submirror-driving cam 121 is at a position for performing depressing of the mirror (FIG. 3(b)), the shutter-charging cam 141 is at a position for releasing shutter charging (FIG. 3(b)). The above-described operation is repeated by the rotation of the first motor M1 in the counterclockwise direction. The first motor M1 repeats a sequence in which it once stops when shutter charging has been completed (FIG. 3(a)) by the sliding contact between the brush 122 and the patterns 161–163. It then rotates again in the same direction when the camera control circuit has detected release operation. It then stops again when depressing of the mirror has been completed (FIG. 3(b)), subsequently. It rotates again in the same direction when the camera control circuit has detected the completion of running of the shutter, and then finally stops again when the next shutter charging has been completed (FIG. 3(a)). The above-described pattern 163 for detecting overrun detects that the overrun at the stop operation of the first motor M1 has a value not less than a predetermined value. That is, if the potential of the pattern 163 for detecting overrun changes from an initial value to ground level at the moment of the completion of shutter charging in FIG. 4(a), or if the detection pattern 163 changes from ground level to an initial value at the moment of the completion of raising the mirror in FIG. 4(b), the detection pattern 163 detects that the overrun has had a value not less than the predetermined value.

Next, the structure of the submirror 70 rotatably supported at the mirror box 60 will be explained.

The submirror 70 is fixed to a supporting plate 72, at both end portions of which there are formed rotation shafts 73. The submirror 70 is rotatably supported at a submirror-driving plate 75 by the rotation shafts 73. A mirror pin 74 is formed at one side of the submirror-driving plate 75, and the mirror pin 74 and the above-described mirror-driving lever 130 are engageable with each other. The supporting plate 72 always receives an energizing force in the clockwise direction (the direction for raising the mirror) by a spring 76 (see FIG. 16). When the mirror-driving lever 130 becomes in a state for permitting the raising of the mirror (see FIG. 3(a)), the submirror 70 rotates in the clockwise direction by the energizing force of the spring 76 and returns to a state in which the mirror is raised (the AF distance-measurement position). The submirror-driving plate 75 also always receives an energizing force in the counterclockwise direction by a spring 77. When the mirror-driving lever 130 is in a state of permitting raising of the mirror, the submirror-driving plate 75 rotates in the counterclockwise direction by the energizing force of the spring 77 and returns to a state in which the mirror is raised.

Next, the structure of the shutter unit 300 mounted to the mirror box 60 will be explained with reference to FIGS. 6(a) and 6(b).

It is to be noted that the single body of the shutter unit 300 has already been applied as Japanese Utility Model Application No. 61-39629 (1986).

FIG. 6(a) shows a state in which shutter charging has been completed, and FIG. 6(b) shows a state in which two screens of the shutter have run after the release of the shutter charging.

In these figures, there are shown a shutter base plate 301 as the above-described supporting frame, and its exposure opening 301a.

A charging lever 302 within the shutter unit 300 for charging front- and rear-blade-driving levers (simply termed hereinafter driving levers) 303 and 304 constitutes shutter driving means. The rear-blade-driving lever 303 is for running a group of rear blades 351, and the front-blade-driving 304 is for running a group of front blades 352.

The seesaw lever 305 for charging up the shutter unit is rotatably pivoted by a rotation shaft 335 planted at the shutter base plate 301, and is provided so that, when it receives a rotation force in the direction of the arrow shown in FIG. 6(b) by the roller 152 of the shutter-charging lever 150 of the shutter charging mechanism shown in FIGS. 3(a) and 3(b) which is engaged with the seesaw lever 305 at one end 305a thereof, another end 305b rotates in the counterclockwise direction in FIG. 6(b) and rotates a leg 302c of the above-described charging lever 302 in the clockwise direction in FIG. 6(b) via a link lever 306 linked thereto. Charging is completed when the state in FIG. 6(b) shifts to the state in FIG. 6(a).

A front tightening lever 307 and a rear tightening lever 308 prevent the rotations of the front driving lever 304 and rear driving lever 303, respectively, charged by the charging lever 302 until a running signal for the shutter is generated from the camera control circuit, which will be described later. Arms 321 and 322 for running the rear blades hold the group of rear blades 351 by forming a parallel link, and run the group of rear blades 351 by rotating around rotation shafts 326 and 327, respectively. Arms 323 and 324 for running the front blades run the group of front blades 352 by rotating around rotation shafts 328 and 329, respectively.

In the present embodiment, in addition to the above-described configuration, there is provided an obturating device having a configuration in which a pair of obturating blades 341 and 342 are raised from a retreated position in FIG. 6(b) to an obturating position in FIG. 6(a) linked with the rotation of the above-described seesaw lever 305 for charging up.

In the obturating device in the present embodiment, the two L-like obturating blades 341 and 342 are subjected to guidance for up and down movements by the engagement of a pin with a long groove with the shutter base plate 301 at a leading portion of the L shape, and the linked operation of up and down movements is provided by the linkage of L-like leg members 341a and 342a with the above-described seesaw lever 305 via shafts 331 and 332, respectively.

The above-described guiding mechanism has a configuration in which a guide pin 371 planted at the shutter base plate 301 is fitted in and engaged with long grooves 341b and 342b provided in a nearly vertical direction and formed in raising portions 341c and 342c of the L shape of the obturating blades 341 and 342.

By the above-described configuration, the obturating blades 341 and 342 perform an up movement from FIG. 6(b) to FIG. 6(a) while almost maintaining the illustrated attitude due to the guiding mechanism by the rotation of the seesaw lever 305 in the counterclockwise direction in FIGS. 6(a) and 6(b), and performs a down movement from FIG. 6(a) to FIG. 6(b) by the rotation of the seesaw lever 305 in the clockwise direction. Furthermore, due to the fact that the linked positions of the obturating blades 341 and 342 with the rotation shafts 331 and 332 are different from each other by a constant amount, strokes of their up and down movements differ from each other. Thus, it is possible to reduce the housing capacity due to an overlap at the retreated position, and to obtain covering of an obturating region over a predetermined range due to a deviated spreading at the obturating position. A spring member 360 always energizes the seesaw lever 305 in the clockwise direction (the direction for releasing charging).

Figure 7:
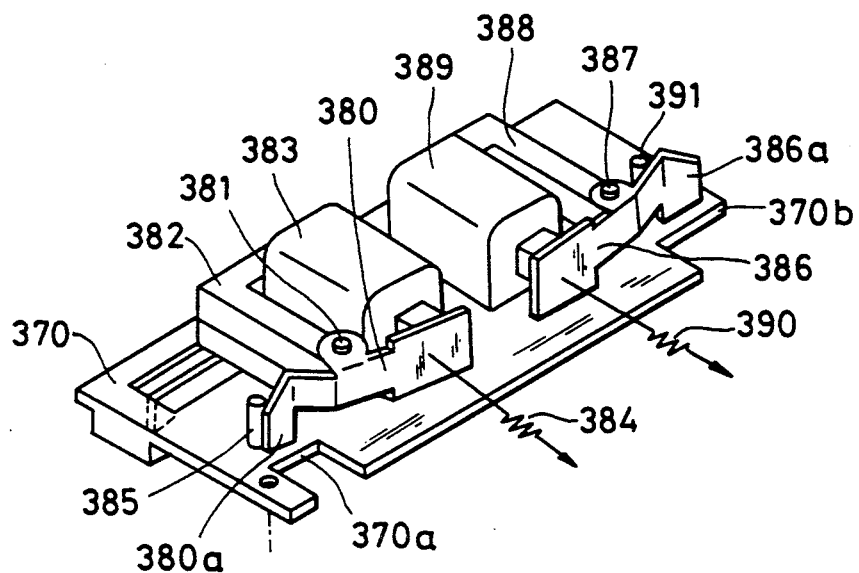
FIG. 7 is a perspective view showing a running-control mechanism of the shutter configuration in FIGS. 6(a) and 6(b)

FIG. 7 shows a configuration for releasing tightening. As the configuration for releasing tightening, the configuration of U.S. Pat. No. 4,364,654 which has previously been applied by the present applicant and disclosed to the public is used.

In FIG. 7, a substrate 370 for the configuration for releasing tightening carries the configuration for releasing tightening by the control of an electromagnet. The substrate 370 is mounted to the above-described shutter base plate 301 in FIGS. 6(a) and 6(b). An armature lever 380 for the front blades and an armature lever 386 for the rear blades are rotatably supported at yokes 382 and 388 mounted to the substrate 370 by shafts 381 and 387, respectively, and energized in the clockwise and counterclockwise directions by springs 384 and 390, respectively. Stopper pins 385 and 391 are screwed in the substrate 370 and regulate initial rotation positions of the armature levers 380 and 386, respectively. One end portion 380a of the armature lever 380 can release tightening by contacting a pin 307a of the front tightening lever 307 at a position rotated in the counterclockwise direction from the initial rotation position shown in FIG. 7 by a predetermined distance. One end portion 386a of the armature lever 386 can release tightening by contacting a pin 308a of the rear tightening lever 308 at a position rotated in the clockwise direction from the initial rotation position shown in FIG. 7 by a predetermined distance. Coils 383 and 389 attract and rotate the armature levers 380 and 386 against springs 384 and 394 by supplying current, respectively. In FIG. 7, the pin 307a of the front tightening lever 307 contacts a notch 370a in the state of shutter charging (FIG. 6(a)). Although omitted in FIG. 6 in order to avoid complication of the figure, it is set so that the front tightening lever 307 is energized in the counterclockwise direction by a weak spring, and the pin 307a contacts the inner edge of the notch 370a. Furthermore, in FIG. 7, the pin 308a of the rear tightening lever 308 contacts a notch 370b in the state of shutter charging (FIG. 6(a)). Although omitted in FIG. 6 in order to avoid complication of the figure, it is set so that the rear tightening lever 308 is energized in the clockwise direction by a weak spring, and the pin 308a contacts the inner edge of the notch 370b. In FIG. 2, there is shown a cover 392 for both preventing dust and serving as an electromagnetic shield.

Now, the operation of the above-described shutter unit will be explained.

When a series of photographing operations have been completed and the shutter has completed running, the camera is in the state in FIG. 6(b).

The charging operation is then immediately performed for preparing photographing operations.

The charging operation is given by the rotation driving of the shutter-charging lever 150 shown in FIGS. 2, 3(a) and 3(b) in the counterclockwise direction. In the charging operation, an operational force in the direction shown by an arrow in FIG. 6(b) is given from the roller 152 of the shutter-charging lever 150 toward the front end 305a of the seesaw lever 305 to give a rotation movement (the clockwise direction in the figures) to the charging lever 302 via the link lever 306 engaged with the shaft 305b at another end of the seesaw lever 305 and the shaft 302c located at the charging lever 302.

In accordance with the rotation of the charging lever 302, leg members 302a and 302b of the charging lever 302 contact roller members 303a and 304a of the driving levers 303 and 304, respectively, to give rotation movement to the driving levers 303 and 304.

The rotations of the driving levers 303 and 304 give rotation movement to the arm 321 for running the rear blades and the arm 323 for running the front blades after the engagement of respective shafts 303b and 304b with hole members 321a and 323a to move the group of rear blades 351 and the group of front blades 352 linked with the respective arms in the upward direction in the figure, respectively.

When the charging thus proceeds, and projections 303c and 304c of the driving levers 303 and 304 reach positions capable of engaging with front ends of the above-described tightening levers 307 and 308, shutter charging is completed, and there is provided the state in FIG. 6(a) in which the next release operation is in readiness.

In the process of charging the seesaw lever 305, the obturating blades 341 and 342 rotatably mounted to the rotation shafts 331 and 332 on the seesaw lever 305, respectively, are moved in the upward direction in the figure. At this time, since the obturating blades 341 and 342 are engaged with the guide pin 371 by respective long guide grooves 341b and 342b, their attitudes are regulated by the guide pin 371. Hence, they move in the upward direction in the figure while keeping their horizontal attitude as shown in the figure, move at the position as shown in FIG. 6(a) in the state of the completion of charging, and cover a lower portion of the exposure opening 301a of the shutter base plate 301.

The charging is completed in this state (see FIG. 6(a)), and performed and held in this state until the next release operation is performed.

Next, the shutter-release operation will be explained.

When the shutter-release button 12 is depressed, the mirror-depressing operation shown in FIG. 3 is performed. At the same time, the shutter-charging lever 150 retreats from the position shown in FIG. 6(a) to the position shown in FIG. 6(b). The seesaw lever 305 is then rotated in the clockwise direction in the figure by the spring member 360 to give a rotation in the counterclockwise direction to the charging lever 302 linked with the seesaw lever 305 by the link lever 306, and moves from the state shown in FIG. 6(a) to the state shown in FIG. 6(b).

In accordance with the above-described rotation of the seesaw lever 305, the obturating blades 341 and 342 rotatably mounted to the seesaw lever 305 by the rotation shafts 331 and 332 are regulated by the guide pin 371 due to respective long guide grooves 341b and 342b. Hence, they move from the state in FIG. 6(a) to the state in FIG. 6(b) while keeping their horizontal attitude as shown in the figure, and retreat to outside of the exposure opening 301a of the shutter base plate 301.

When the camera control circuit detects the completion of the above-described operation and the completion of depressing the mirror (detects that the potential of the pattern 162 for detecting depression of the mirror changes from ground level to an initial level in the state in FIG. 4(b)), the camera control circuit first supplies current for the coil 383 in FIG. 7. The armature lever 380 is then attracted to an attraction surface of the yoke 382, and rotates in the counterclockwise direction against the spring 384. By the attracted rotation of the armature lever 380, an end portion 380a thereof pushes the pin 307a. The front tightening lever 307 then rotates in the clockwise direction to take off the engagement with the projection 304c. The front driving lever 304 then rotates in the clockwise direction. The arm 323 for running the front blades also rotates in the same direction, and runs the group of front blades 352 (running in the downward direction in the figure) to start exposure. At a predetermined shutter-speed timing, current is supplied for the coil 389 in FIG. 7 by the camera control circuit. The armature lever 386 is then attracted to an attracting surface of the yoke 388, and rotates in the clockwise direction against the spring 390. By the attracted rotation of the armature lever 386, an end portion 386a thereof pushes the pin 308a. The rear tightening lever 308 then rotates in the clockwise direction to take off the engagement with the projection 303c. The rear driving lever 303 then rotates in the clockwise direction. The arm 321 for running the rear blades also rotates in the same direction, and runs the group of rear blades 351 (running in the downward direction in the figure) to terminate exposure.

An explanation has been provided of the mirror-box driving mechanism 100 configured by being incorporated in the mirror box and the shutter unit 300.

Figure 8:
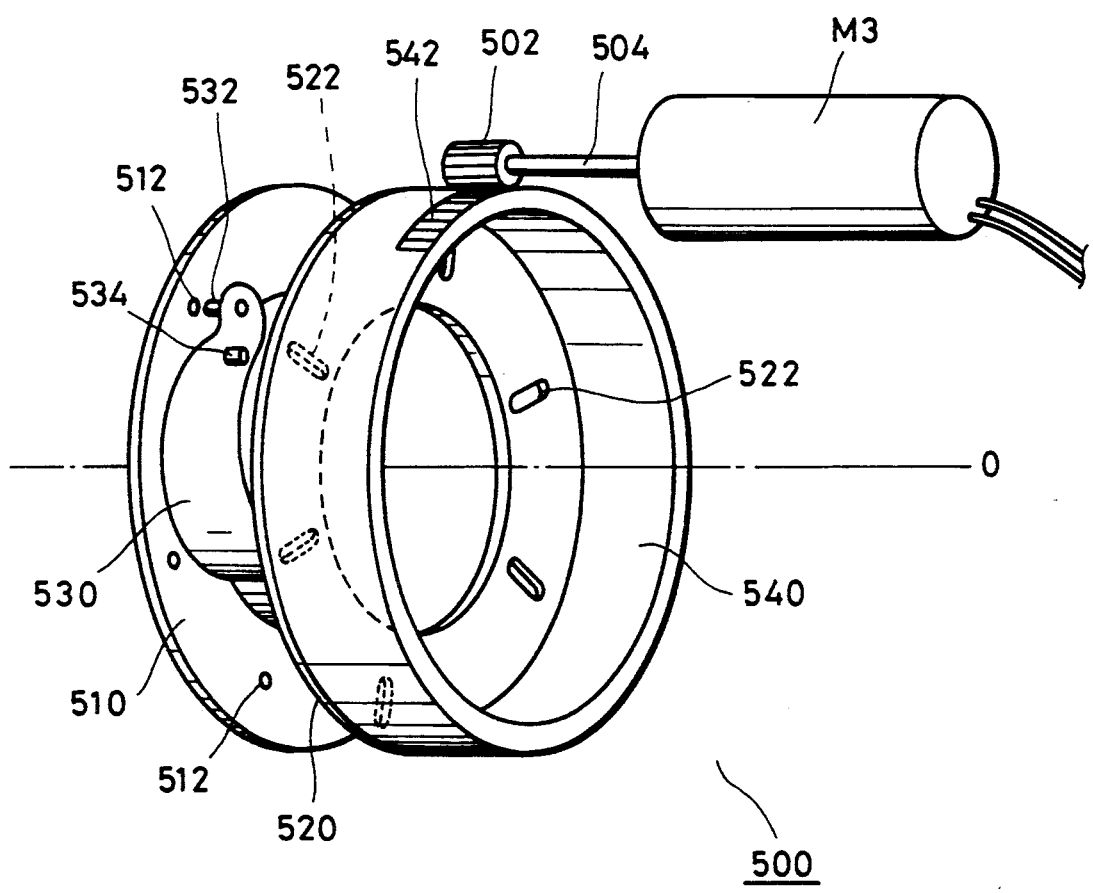
FIG. 8 is a perspective view showing a diaphragm-driving configuration within a photographing lens.

Next, an electrically-driven diaphragm mechanism configured within the photographing lens 20 shown in FIG. 1 will be explained with reference to FIG. 8. In FIG. 8, a third motor M3 is fixed to a fixed tube (not illustrated). In a fixed ring 510, plural holes 512 are formed with an equal interval on a circumference centering around an optical axis O. In a rotatably-supported diaphragm driving ring 520, plural cam holes 522 are radially formed on its circumference with an equal interval. A diaphragm blade 530 is disposed between the fixed ring 510 and the diaphragm-driving ring 520, and pins 532 and 534 screwed on both of its surfaces are inserted in a hole 512 of the fixed ring 510 and a cam hole 522 of the diaphragm-driving ring 520, respectively. A gear cylinder 540 is rotatably supported, and fixed to the diaphragm-driving ring 520. A gear member 542 is formed on the surrounding surface of the gear cylinder 540, and the gear member 542 meshes with an output gear 502 fixed at an output shaft 504 of the third motor M3.

By the rotation of the third motor M3 in the counterclockwise direction, the gear cylinder 540 rotates in the clockwise direction. The diaphragm driving ring 520 also rotates in the clockwise direction in accordance with the rotation of the gear cylinder 540, and the diaphragm blade 530 is driven in the stopped direction (the counterclockwise direction) by a sliding movement with the cam hole 522. That is, the diaphragm is driven from an open state toward a stopped state.

On the other hand, by the rotation of the third motor M3 in the clockwise direction, the gear cylinder 540 rotates in the counterclockwise direction. The diaphragm-driving ring 520 also rotates in the counterclockwise direction in accordance with the rotation of the gear cylinder 540, and the diaphragm blade 530 is driven in the opened direction (the clockwise direction) by a sliding movement with the cam hole 522. That is, the diaphragm is driven from a stopped state toward an open state.

Next, an embodiment of the circuit configuration for controlling each of the above-described each mechanisms will be explained with reference to the drawing.

Figure 14:
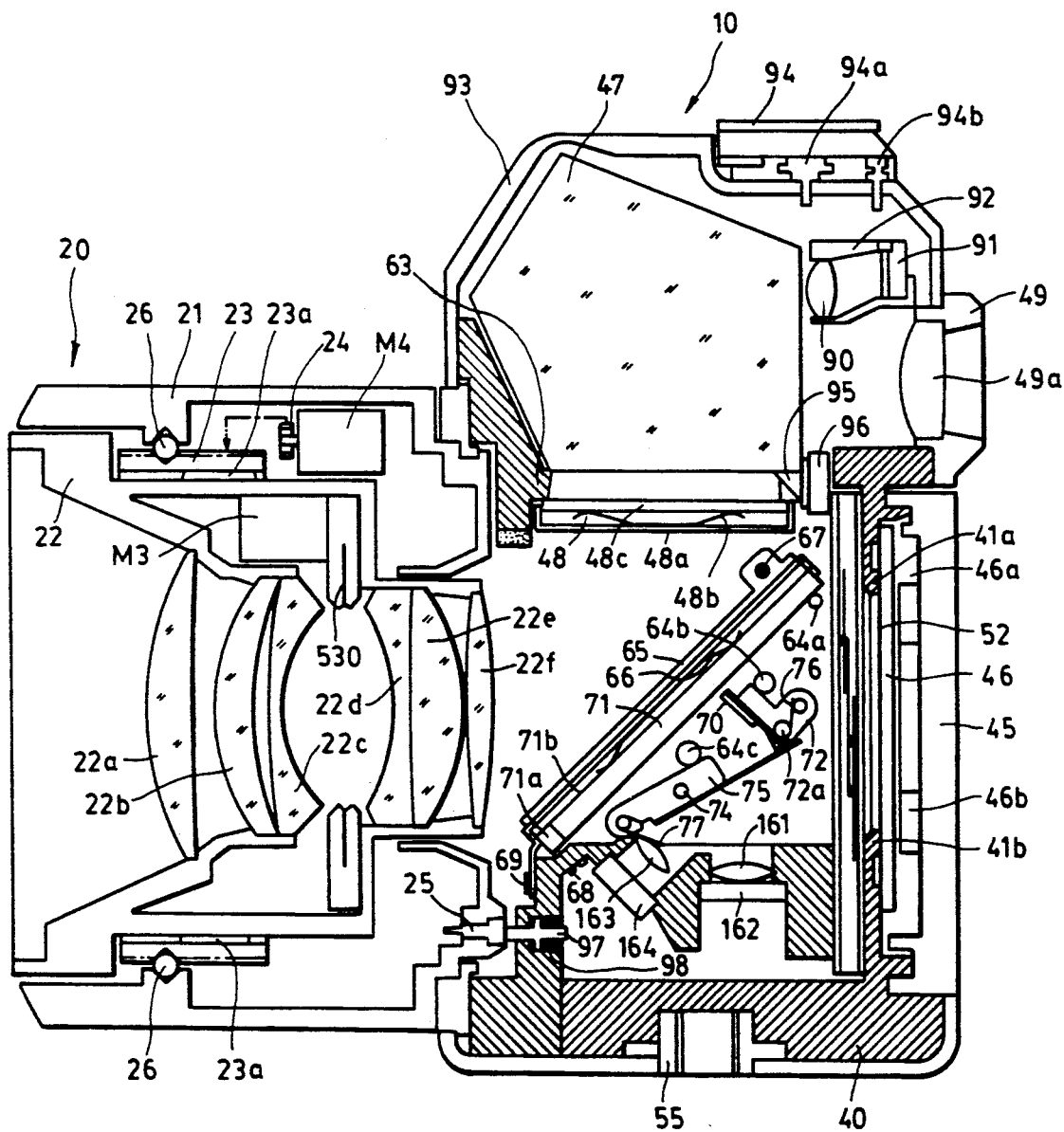
FIG. 14 is a central cross-sectional view when a first optical element and a second optical element are in an AF distance measurement state.

FIG. 14 is a central cross-sectional view of a single-lens reflex camera of the present embodiment, and represents a position in which the submirror as the second optical element is raised (the AF distance-measurement position). The main body 40 of the camera has rail surfaces 41a and 41b for performing the position regulation of a plate 46 and the film 52 at its upper and lower portions. A structure 63 configured as one body with the mirror box performs the position regulation of a pentaprism 47e, a focusing screen 48c, a spring 48b for upwardly energizing the screen 48c, and a focusing-screen unit 48 having a frame 48a of a finder optical system. A screw 55 for a tripod is fixedly provided at the main body 40 of the camera. A back cover 45 protects the film 52 from light. Plate springs 46a and 46b energize the plate 46 against the rail surfaces 41a and 41b, respectively. An eyepiece lens 49a is fixed to an eyepiece frame 49. A photometric lens 90 guides light toward a photometric sensor 91, and is fixed to a photometric-sensor holder 92 together with the photometric sensor 91 with a proper position relationship. A shoe 94 for a stroboscopic device is fixedly provided at an upper cover 93 for protecting the upper portion of the camera. There are shown a well-known synchronizing contact 94a, and a signal contact 94b for transmitting various signals between the camera and the stroboscopic device to the side of the stroboscopic device. Although only one signal contact is represented in FIG. 14, there are actually plural signal contacts. A prism 95 for display in the finder provided at a lower portion of the pentaprism 47 is disposed so that display contents of a display device 96 for displaying finder information are displayed at a lower portion of the field of view of the finder when viewed from the eyepiece frame 49. A contact 97 for the communication between the camera and the lens and for supplying power of a power supply from the camera to the lens side is energized toward the lens side by a spring 98. (Although only one contact is represented, there are actually plural contacts.) A pair of fixed pins 64a fixed at the mirror box 60 are provided at the right and the left. At a semitransparent fixed-mirror frame 71a, a thin-film semitransparent mirror 71b as a light-splitting element is stretched to form a first optical element 71. The first optical element 71 has been subjected to vacuum-deposition process so that the light transmitting through an optical system 22a -22f of the photographing lens is divided to the finder optical system (the pentaprism side) and the photographing system (the film side) with a predetermined ratio (for example, 60:40). A pushing frame 65 having a spring 66 for energizing the first optical element 71 at a predetermined position is rockably supported by a pin 67 fixed at the mirror box 60 as the rotation shaft. A screw 68 for adjusting the mirror adjusts the first optical element 71 at about 45 degrees relative to the optical axis of the lens. A fixing screw 69 fixes the first optical element 71 by energizing it by the pushing frame 65. A lens 161 for an AF sensor guides the light guided by a second optical element 70 toward an AF sensor unit 162. A lens 163 for the light control of the stroboscopic device guides light toward a sensor 164 for TTL (through the lens) light control for measuring the light of a stroboscopic tube reflected by the film 52. A fixed pin 64c fixed at the mirror box 60 regulates a submirror-driving plate 75 at a predetermined position by an energizing force in the counterclockwise direction caused by a submirror-driving-plate returning spring 77. A fixed pin 64b fixed at the mirror box 60 also regulates the second optical element 70 at a predetermined position during AF distance measurement by an energizing force of a submirror-energizing spring 76 which functions between a submirror-fixing plate 72 and the submirror-driving plate 75, and energizes the submirror-fixing plate 72 always toward the clockwise direction. A total-reflection mirror 70 for AF distance measurement as the second optical element is fixed to a carrier plate 72. The carrier plate 72 is rockably pivoted relative to the submirror-driving plate 75 by a shaft 72a.

A well-known interchangeable lens 20 for a single-lens reflex camera naturally includes an AF-manual switching mechanism for performing switching between AF (autofocusing) and manual focusing by an external operation between transmission members 23 and 24, as well as an electric switch linked with the AF-manual switching mechanism. A contact 25 is a contact at the lens side which corresponds to the contact at the camera side, for the communication between the camera and the lens and for being supplied with power from a power supply from the camera to the lens side. Although only one contact is represented, there are actually plural contacts. A bearing 26 is provided for smoothly rotating a lens support 54, to which the optical system 22a -22f is fixedly provided, relative to the transmission member 23. The transmission member 23 is a helicoid member having a helicoid 23a, and transmits the output of a motor M4 via a pinion gear 24, a reduction mechanism (not illustrated) and the AF-manual switching mechanism. A stepping motor M3 as an actuator for the electrically-driven diaphragm mechanism shown in FIG. 8 performs driving control of the diaphragm blade 530.

Figure 15:
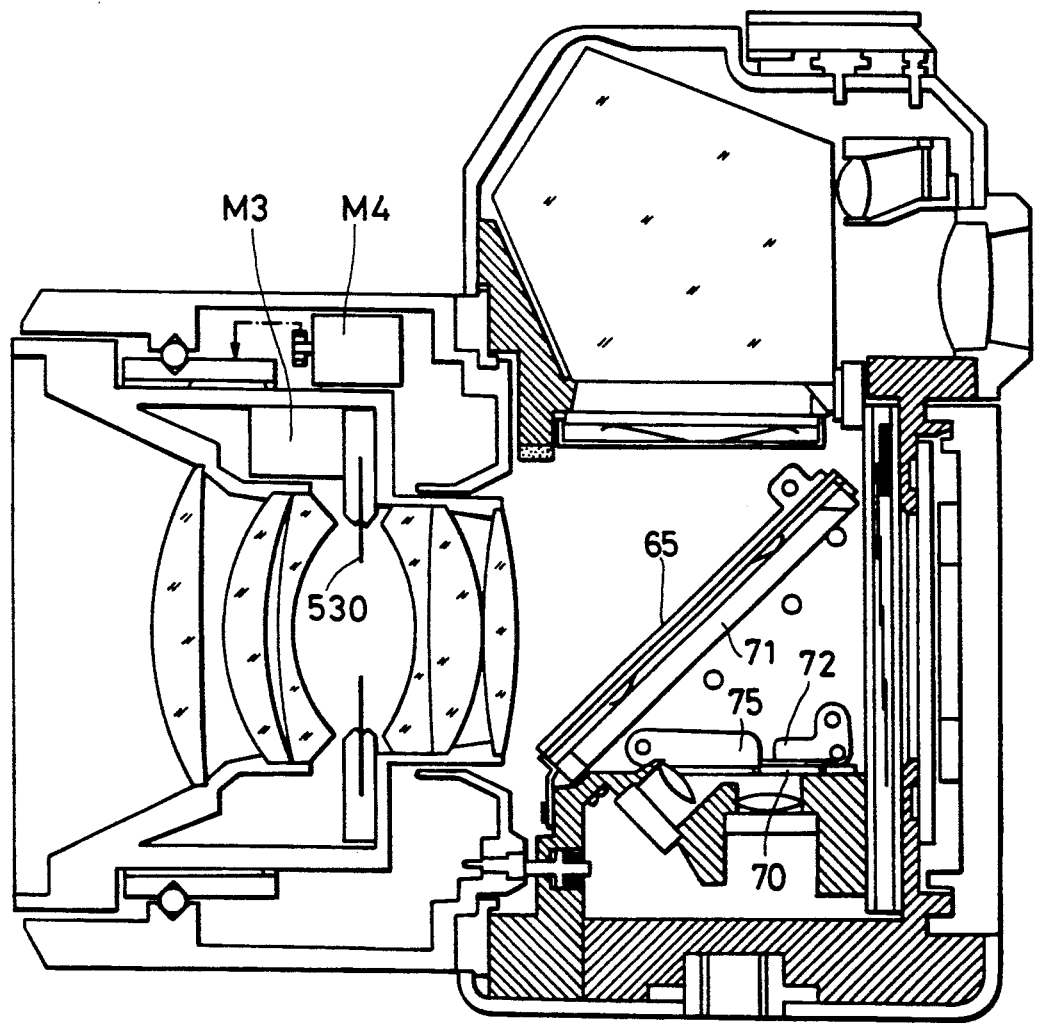
FIG. 15 is a central cross-sectional view when the first optical element, the second optical element and an electromagnetic diaphragm mechanism are in a preparatory state for photographing operation.

FIG. 15 is a diagram representing the second optical element and the state of diaphragm control of the lens when shifting from the AF distance-measurement state shown in FIG. 14 to the state of preparation for photographing operations.

Now, the operation from the state shown in FIG. 14 to that shown in FIG. 15 will be explained. In the state in FIG. 14, a defocused amount of a focus is calculated by a well-known AF arithmetic circuit from the output of the AF sensor 162 by a first stroke of the shutter-release button. A driving signal is given to the AF motor M4 according to the result of the arithmetic operation, and the focus is adjusted. Control values for the shutter and the diaphragm are determined by a well-known photometric circuit in accordance with the output of the photometric sensor 91. When the photometric calculation has been completed, current is supplied to the motor M1 shown in FIG. 2. The submirror-driving lever 130 is then turned to the left, the submirror-driving plate 75 is turned to the right, the submirror-carrier plate 72 is turned to the left by a cam (not illustrated) provided at the mirror box 60, and the second optical element 70 moves downward to retreat from the photographing optical path. After the lapse of 15 ms (milliseconds) after the current supply for the motor M1, current is supplied for the stepping motor M3, and the diaphragm blade 530 is stopped at a diaphragm value based on the photometric value. When the motor M1 rotates a predetermined angle, current supply for the motor M1 is stopped, and an input signal (release signal) of a second switch by a second stroke of the shutter-release button is in readiness (the state of preparation for photographing operation shown in FIG. 15.) When the second switch is input from this state, the shutter immediately shifts to a running state. Accordingly, time required for the first screen of the shutter to start to open from the moment of the input of the second switch (a release time lag) suffices to be only a few milliseconds which are necessary for a delay in the shutter magnet and processing in the electronic control circuit. The current supply for the stepping motor M3 after the current supply for the motor M1 is delayed 15 ms, in order to prevent loss of synchronism of the motor M3 due to the overlap of rush current of the motor M1 and current supply for the stepping motor M3.

Figure 9A:
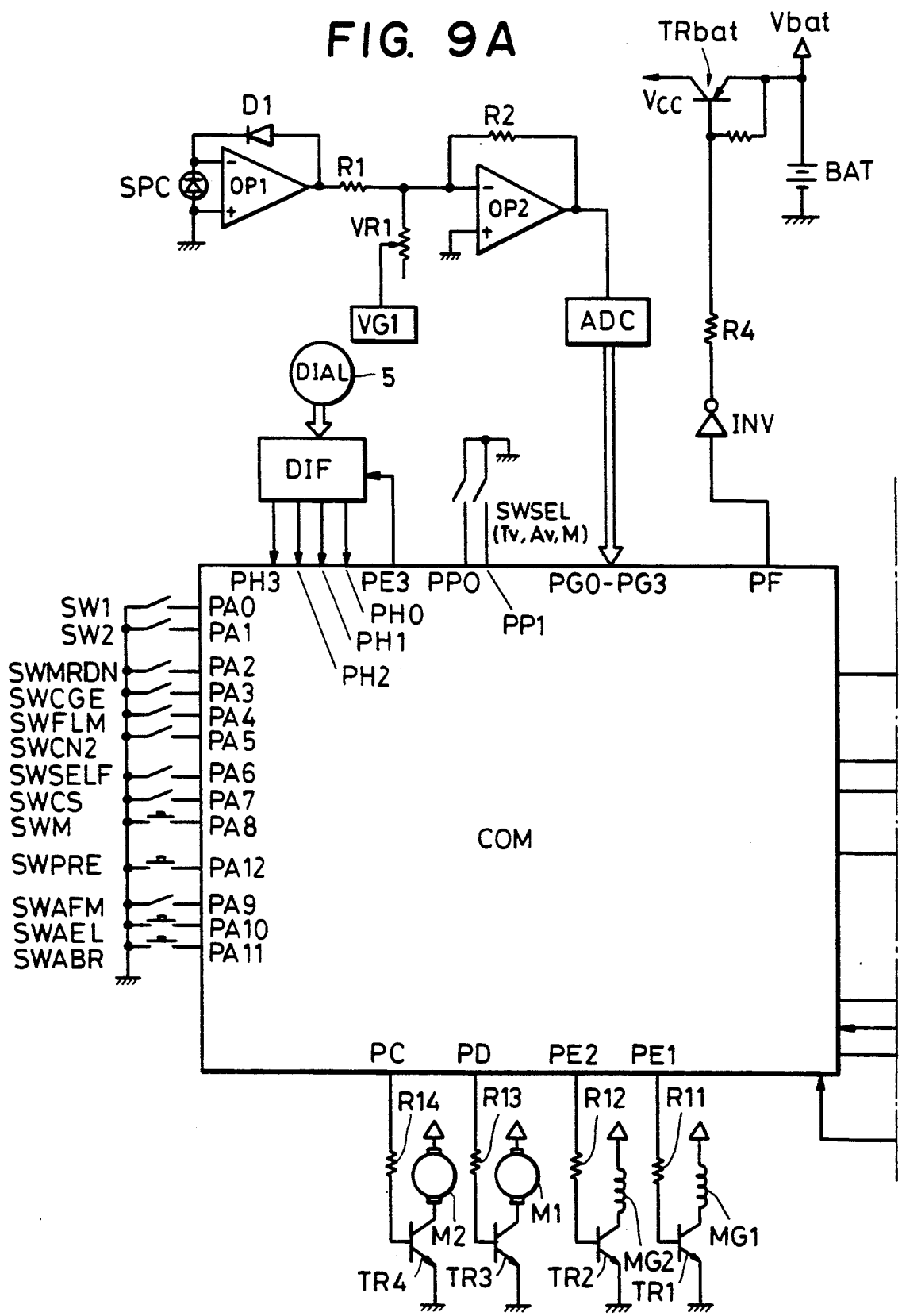
FIG. 9, composed of FIGS. 9A and 9B, is a circuit diagram for controlling the operation of each mechanism.
Figures 9, 9B:
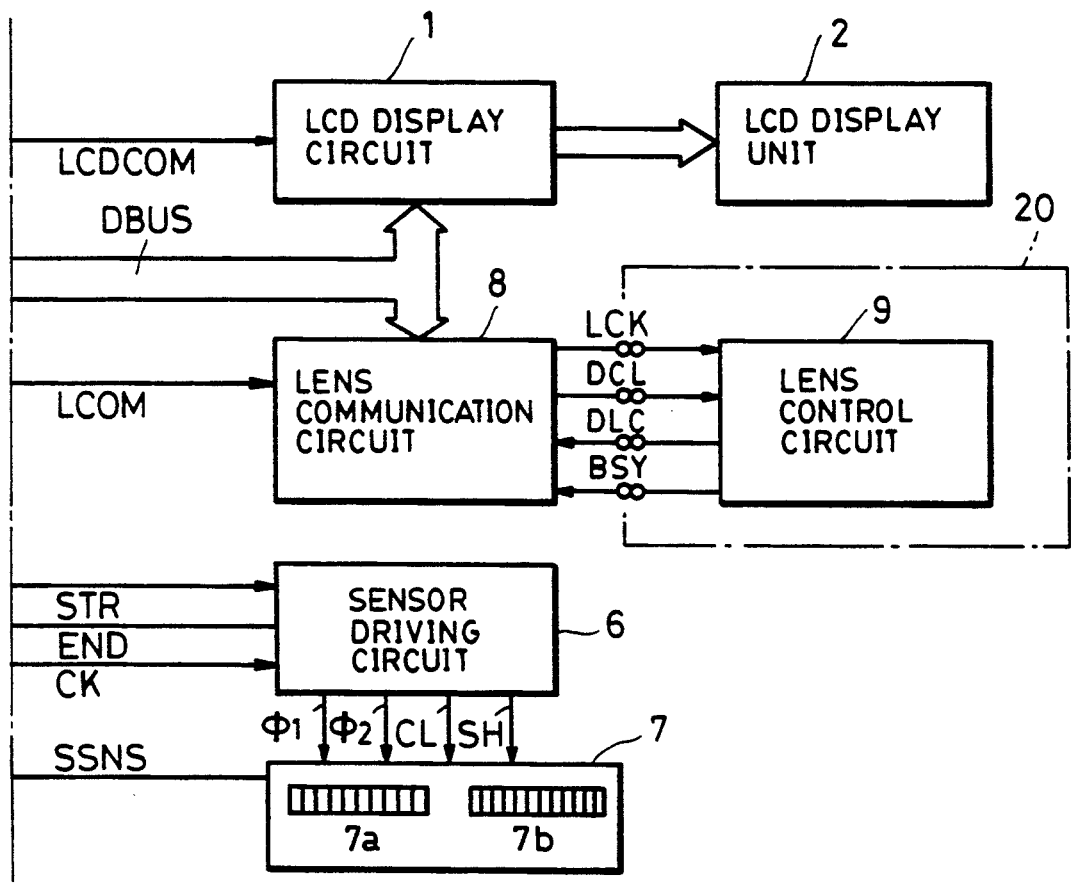

FIG. 9 shows an electric circuit of a concrete example in which a microcomputer COM is used for the operation control of a camera according to the present invention.

A photosensor SPC receives reflected light from an object, and outputs a photoelectric signal to an operational amplifier OP1 having high input impedance to a feedback circuit of which a compression diode D1 is connected. The operational amplifier OP1 outputs object-brightness information $B_v$ subjected to logarithmic compression via a resistor R1. A variable resistor VR1 connected to a constant-voltage source VG1 outputs film-sensitivity information $S_v$. An operational amplifier OP2 to a feedback circuit of which a resistor R2 is connected calculates photometric information $E_v = (B_v + S_v)$ and outputs the result. The photometric information $E_v$ is converted into a 4-bit digital value by an A/D converter ADC, and is input to input ports PG0–PG3 of the microcomputer COM.

When a dial 5 is operated, a number corresponding to its click number is counted at a dial interface circuit DIF. The counted value is converted into 4-bit information, and is input to input ports PH0–PH3 of the microcomputer COM. The information within the dial interface circuit DIF is reset by an input of a pulse signal from an output port PE3 of the microcomputer COM. A two-throw exposure-mode switch SWSEL is turned on and off according to which mode is selected by an exposure-mode selection knob (not illustrated), and 2-bit information corresponding to a selected exposure mode is input to input ports PP0 and PP1 of the microcomputer COM.

When a battery BAT is loaded in the camera, a power supply voltage $V_{bat}$ is supplied for the microcomputer COM, and LCD display circuit, an LCD display, the dial interface circuit DIF and the like. When a first-stroke switch SW1 connected to an input port PA0 is switched on by a first stroke of the shutter-release button 12 in FIG. 1, the potential of an output port PF becomes at a high level. Hence, a transistor TRbat is turned on by an interter INV and a resistor R3, and the power supply voltage $V_{bat}$ is supplied as a power supply voltage $V_{cc}$ for circuits which consume a relatively large amount of electric power, such as operational amplifiers OP1, OP2 for photometry and the like.

To input ports PA1–PA11 of the microcomputer COM, there are connected a second-stroke switch SW2 which is switched on by a second stroke of the shutter-release button 12, a submirror-raising switch SWMRDN which is switched on by the depression of the submirror and switched off by the raising of the submirror, a charging-completion detection switch SWCGE which is switched on by the completion of mechanical charging, a film switch SWFLM which is switched on every time feeding of one frame of a film is completed, a second-screen switch SWCN2 which is switched on at the completion of running of the second screen, a self switch SWSELF which is switched on by the setting of a self-timer by an operation lever (not illustrated), a switch SWCS which is turned on, for example, by the selection of a successive photographing mode by a successive-photographing/single-photographing selection lever (not illustrated) and turned off by the selection of a single photographing mode, a switch SWM for setting a stop value at a manual exposure mode (not illustrated), an autobracket (not illustrated) switch SWABR, a switch SWAFM for selecting whether automatic distance measurement is performed by one shot or by servo, a switch SWAEL for selecting whether or not the stop value and the shutter speed determined by photometry are locked, and a stopping switch SWPRE for previously stopping in order to confirm the depth of field of a picture to be photographed in the finder, respectively.

The bases of transistors TR1 and TR2 are connected to output ports PE1 and PE2 via resistors R11 and R12. The transistors TR1 and TR2 control current supply for a first-screen magnet MG1 for running the first screen and a second-screen magnet MG2 for running the second screen, respectively. The bases of transistors TR3 and TR4 are connected to output ports PD and PC via resistors R13 and R14, respectively. The transistor TR3 controls the driving of the mirror and the driving of the motor M1 for charging and rewinding, and the transistor TR4 controls the driving of the motor M2 for winding.

A photosensing circuit 7 for distance measurement including a pair of line sensors 7a and 7b constitutes an autofocusing (AF) system together with an AF-sensor driving circuit 6. The AF-sensor driving circuit 6 outputs control signals 01, 02, CL and SH in accordance with signals STR and CK input from the microcomputer COM, and drives the photosensing circuit 7. The photosensing circuit 7 outputs image information SSNS to the microcomputer COM in accordance with the above-described control signals.

A lens communication circuit 8 receives data input via a data bus DBUS while a control signal LCOM from the microcomputer COM is being input, and performs serial communication with a lens control circuit 9 (disposed within the interchangeable lens 20) according to the data. Data DCL for driving the lens are transmitted to the lens control circuit in synchronization with a clock signal LCK, and at the same time lens information DLC is serially input.

A signal BSY notifies the camera side of the fact that a lens for focal adjustment (the optical system 22a–22c in FIG. 14) is moving. While this signal is being generated, the above-described serial communication is not performed. According to the serial communication, the lens control circuit 9 drives a range ring of the lens and the control of the diaphragm.

An LCD display circuit 1 receives data input via the data bus DBUS while a control signal LCDCOM from the microcomputer COM is being input, and has an LCD display unit 2 to display various kinds of data according to the data. The LCD display unit 2, which is a liquid crystal display unit, displays shutter speed ($T_v$ value), stop value ($A_v$ value), discrimination between successive photographing and single photographing operations, whether or not AF is at a one-shot mode or a servo mode, and the like.

An image of an object passes through the optical system 22a–22f of the photographing lens and the first optical element 71, is reflected at the second optical system 70, passes through the lens 161 for the AF sensor, and reaches the line sensors 7a and 7b of the photosensing circuit 7 for distance measurement within the AF sensor unit 162. In a state stopped by the diaphragm blade 530, the amount of light which each element of the line sensors receives changes due to hindrance in the optical path. Hence, when performing a distance measurement operation, it is necessary to open the diaphragm or stop the diaphragm to a degree of having little hindrance in the optical path so as not to adversely influence distance measurement.

Figure 10A:
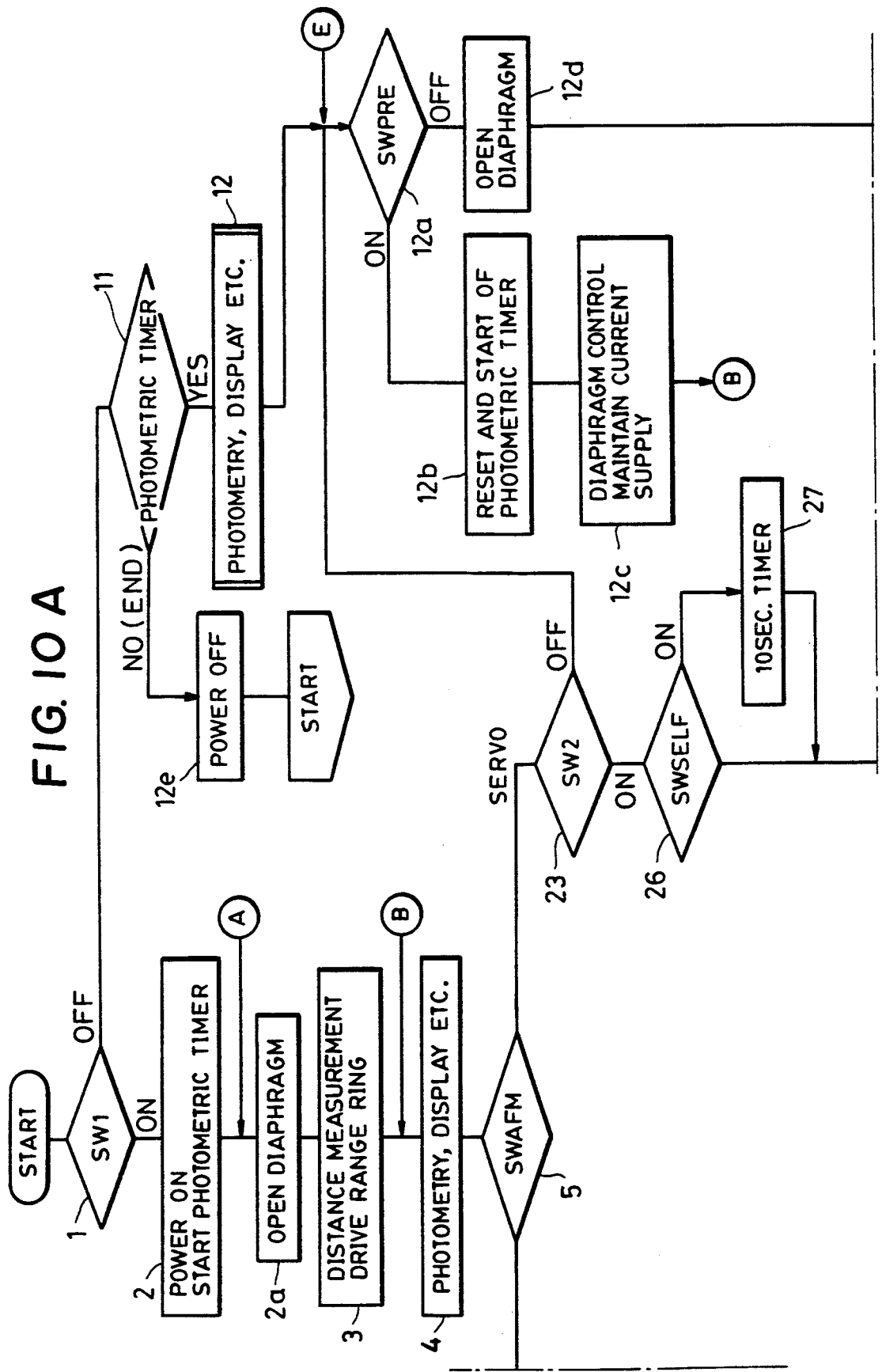
FIG. 10, composed of FIGS. 10A, 10B and 10C, is a flowchart for explaining the operation of the circuit in FIG. 9.
Figure 10B:
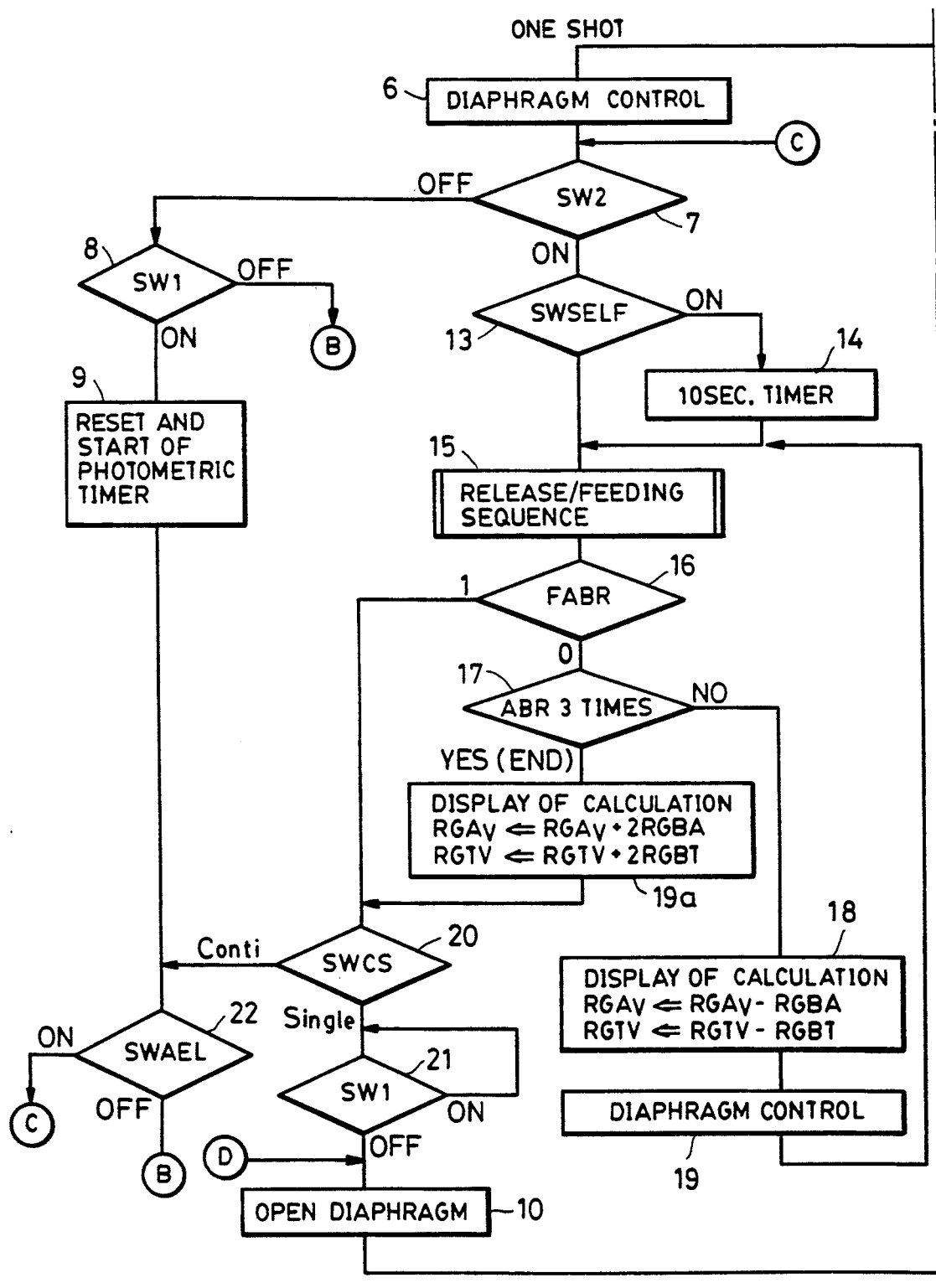

FIG. 10 is a flowchart of the operation of the camera to which the present invention is applied.

By the loading of the battery BAT in the camera and the generation of the power supply voltage $V_{bat}$, the microcomputer COM starts its operation.

[Step 1] If only a first stroke of the shutter-release button 12 is performed by the photographer, and an on-signal of the first-stroke switch SW1 is input to the input port PAO, the process proceeds to step 2. When the on-signal is not input, the process proceeds to step 11.

[Step 2] A signal "1" is output from the output port PF to turn on the transistor TRbat, and the power supply voltage Vcc is supplied for each unit. A photometric timer is then started. The photometric timer is provided for continuously supplying the power supply voltage Vcc for a predetermined time from the input of an off-signal of the first-stroke switch SW1. The photographer can thereby confirm the photometric state for a predetermined time even when the photographer releases the shutter-release button 12, and it becomes possible to change set information while watching a display by an exposure-mode selection knob (not illustrated). This procedure can be simply performed by a hardware timer incorporated within the microcomputer COM.

[Step 2a] Since it is impossible to know in which state the diaphragm is in at the moment of the loading of the battery, it is necessary to perform an operation of causing the diaphragm to be in an open state before performing the distance measurement operation. Data for causing the diaphragm to be in an open state are transmitted to the lens communication circuit 8 via the DBUS, and the lens communication circuit 8 tramsits the data to the lens control circuit 9 by serial communication. The lens control circuit 9 supplies current for the stepping motor M3, and causes the diaphragm blade to be in an open state. Subsequently, by communication from the microcomputer COM, the lens control circuit 9 stops current supply for the stepping motor M3.

[Step 3] Communication with the lens for driving the range ring of the lens according to a series of distance measurement operation is performed. The details thereof will be explained.

When the signal STR is output from the output port to the AF-sensor driving circuit 6, the AF-sensor driving circuit 6 sequentially outputs signals 01, 02, CL and SH in synchronization with the signal CK, and has the photosensing circuit 7 store and read image signals. Read image signals are sequentially input to the input port from the SSNS in synchronization with the signal CK. The microcomputer COM calculates a defocused amount by the data.

While the LCOM is being output from the output port, the lens communication circuit 8 receives data for the lens driving amount according to the defocused amount via the DBUS. The lens communication circuit 8 transmits data to the lens control circuit 9 by serial communication to have it perform driving of the range ring of the lens.

Figure 11A:
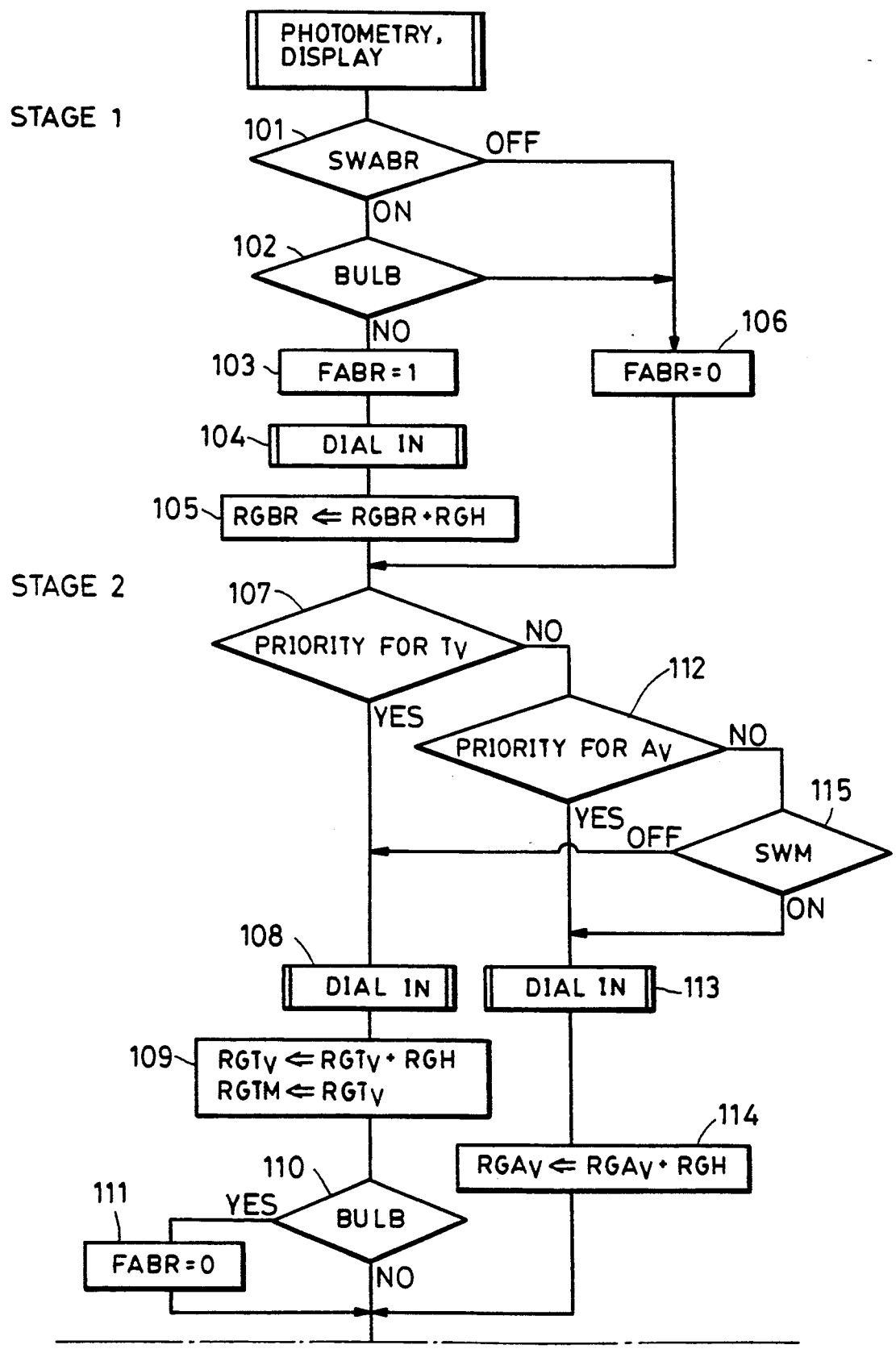
FIG. 11, composed of FIGS. 11A and 11B, is a flowchart for explaining the operations of photometry, display and sequence.

[Step 4] Photometry, display and other sequences will be explained with reference to FIG. 11.

Stage:1

Autobracket processing is performed at steps 101–106. [Step 101] Determination of the autobracket switch SWABR is performed. When autobracket is selected, the process proceeds to step 102. When not selected, the process proceeds to step 106.

[Step 102] Whether or not the contents of a register RGTM are at a bulb mode is determined. The register RGTM stores shutter-speed data, and the storage is performed at step 109 and the like. At the bulb mode, the process proceeds to step 106.

[Step 103] A flag FABR indicating that the autobracket mode is set is set to 1.

Figure 12:
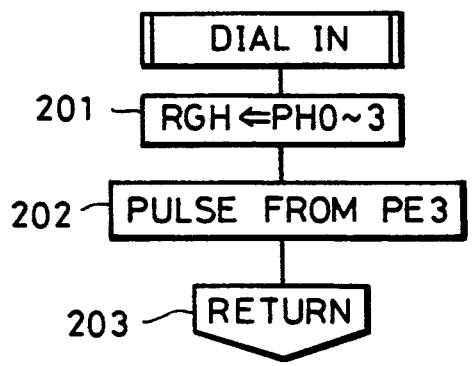
FIG. 12 is a flowchart for explaining the operation of information reading.

[Step 104] In this step, an information reading routine accompanying the operation of the dial 5 is executed. Now, the information reading routine accompanying the dial operation will be explained with reference to FIG. 12.

[Step 201] Information to be input to the input ports PH0–PH3 is stored in a register RGH for dial. At this time, a numerical value corresponding to a click number of the dial 5 and information whether the numerical value is positive or negative according to the direction of the rotation of the dial 5 are stored in the register RGH. That is, 4-bit information on how many steps exposure is to be shifted up or down from the present information is stored.

[Step 202] A pulse signal of the output port PE3 is output. The numerical value of the dial interface circuit DIF is thereby reset to 0.

[Step 203] The process returns to the initial step. In this case, at step 104, previously-set 3-frame autobracket photographing operations are performed, in which exposure is automatically changed, for example, at steps "−0.5, 0, 0.5" if step information "0.5 step" has been set by the dial 5, and at steps "−1, 0, 1" if step information "1 step" has been set. The above-described photographing operations at steps "−0.5, 0, 0.5" indicate that photographing operations are successively performed at 3-staged exposure values, that is, an exposure value underexposed by −0.5 step relative to a standard exposure value obtained by calculation, the standard exposure value, and an exposure value overexposed by 0.5 step relative to the standard exposure value.

[Step 105] The contents of a register RGBR for bracket steps and the contents of the dial are added together, and the result is stored again in the register RGBR. As described above, it is assumed that the minimum resolution by one click of the dial 5 can be freely set either at every 0.5 step or at every 1 step. When the set resolution is different from the resolution of the shutter speed timing and the stop value, a program for multiplying the contents of the register RGBR by an integer may be inserted. A detailed explanation thereof will be omitted since this procedure is not related with the present invention.

[Step 106] When autobracket is not selected, the flag FABR is reset to 0.

Stage:2

At steps 107–115, the setting of the Tv value (the shutter speed) and the Av value (the stop value) by dial operation is performed.

[Step 107] Whether or not a shutter-preference mode is set is determined from the input state of the input ports PP0 and PP1. If the shutter-preference mode is set, the process proceeds to step 108.

[Step 108] Like step 104, the information-reading routine accompanying the operation of the dial 5 is executed.

[Step 109] The numerical value set by the dial operation (the contents of the register RGH) and the shutter information (the contents of a register RGTv) are added together, and the result is stored again in the register RGTv for shutter information. In addition, the contents of the register RGTv for shutter information are stored in the register RGTM.

[Step 110] Whether or not a code indicating the bulb mode located next to the longest shutter-speed time is stored in the register RGTM is determined. If not at the bulb mode, the process proceeds to Stage:3 (step 116).

Next, a case in which the bulb mode is set by operating the dial 5 after the setting of the autobracket mode will be described. Since bracket photographic operation at bulb photographic operation is basically meaningless, it is more effective to release the autobracket mode. Accordingly, when it is determined that the camera is at the bulb mode at step 110, the process proceeds to step 111.

[Step 111] The flag FABR of the autobracket mode is reset to 0.

If a diaphragm-preference mode has been set, the process proceeds as step 107→step 112→step 113.

[Step 113] At this step, as at step 104, the information-reading routine accompanying the operation of the dial 5 is executed.

[Step 114] The numerical value set by the dial operation (the contents of the register RGH) and the stop-value information (the contents of a register RGAv) are added together, and the result is stored again in the register RGAv for diaphragm information.

If a manual-exposure mode has been set, the process proceeds as step 107→step 112→step 115.

[Step 115] The on-off state of the switch SWM for setting stop values is determined. The camera has a configuration in which the stop value can be modified by operating the switch SWM for setting stop values and performing dial operation, and the shutter-speed time can be modified by performing only dial operation. Hence, when the switch SWM is switched on, the process proceeds to the execution of a routine identical to that at the diaphragm-preference mode (step 113), and when the switch SWM is switched off, the process proceeds to the execution of a routine identical to that at the shutter-preference mode (step 108).

Stage:3

At steps 116–128, photometry, and the settings of the Tv value and the Av value are performed.

[Step 116] The photometric information Ev converted into a 4-bit digital value by an A/D converter ADC is stored in an internal register RGEv.

[Step 117] It is determined whether or not the shutter-preference mode is set from the input state of the input ports PP0 and PP1. If the shutter-preference mode is set, the process proceeds to step 5.

[Step 118] The contents of the register RGTv for shutter information storing information set by the operation of the dial 5 are subtracted from the contents of a register RGEv, and the result (diaphragm information Av) is stored in the register RGAv for diaphragm information. It is assumed that the contents of all registers within the microcomputer COM are held while the battery BAT is loaded. It is also assumed that, when the battery BAT is first loaded, a value having a high frequency of usage, for example, information 1/125 second, has initially been set.

[Step 119] The contents of the register RGBR storing information for exposure steps of autobracket are stored in a register RGBA for bracket steps of the diaphragm. In addition, the contents of a register RGBT for bracket steps of the shutter are set to zero (0). The process proceeds to step 124.

If the diaphragm-preference mode has been set, the process proceeds as step 117→step 120→step 121.

[Step 121] The contents of the register RGAv storing information set by the operation of the dial 5 and the switch SWM for setting the stop value are subtracted from the contents of the register RGEv, and the result is stored in the register RGTv for shutter information. It is assumed that, when the battery BAT is first loaded, a value having high frequency of usage, for example, information F5.6, has initially been set.

[Step 122] The contents of the register RGBR for bracket steps storing information for exposure steps of autobracket are stored in the register RGBT for bracket steps of the shutter. In addition, the contents of the register RGBA for bracket steps of the diaphragm are set to zero.

The process then proceeds to step 124.

If the manual exposure mode has been set, the process proceeds as step 117→step 120→step 123.

[Step 123] The contents of the register RGTM storing shutter-speed time information set by operation of the dial 5 are stored in the register RGTv for shutter information. This procedure is provided for storing the information set by the operation of the dial 5 as it is, because the contents of the register RGTv change at every photographing operation when autobracket photographing operation has been set at the manual-exposure mode. The detail of this procedure will be described later.

Subsequently, the process proceeds in a sequence identical to that at the diaphragm-preference mode.

[Step 124] The state of the flag FABR indicating whether or not the autobracket mode has been set is determined. If the autobracket mode has not been set, the process proceeds to Stage:4 (step 129).

Next, the exposure calculation at the autobracket mode will be explained. The contents of the register RGBR for bracket steps are stored in the register RGBA for bracket steps of the diaphragm in the case of the shutter-preference mode, as described in step 119, and in the register RGBT for bracket steps of the shutter in the case of the shutter-preference mode and the manual-exposure mode, as described in step 122, respectively. At step 124, the camera is set at the autobracket mode and the flag FABR has been set to 1. Hence, the process proceeds to step 125.

[Step 125] Whether or not the contents of the register RGBR for bracket steps are zero is determined. If the contents are zero, three photographing operations are performed at an identical exposure (standard exposure in the present embodiment). Since this procedure would be pointless, it is necessary to prohibit the autobracket photographing operation. Accordingly, the process proceeds to step 126 in this case.

[Step 126] The flag FABR indicating the autobracket mode is reset to 0.

By subsequently proceeding to Stage:4 (step 129), the exposure calculation of autobracket is not performed, but a normal routine is executed.

When the contents of the register RGBR for bracket steps are not zero at the above-described step 125, the process proceeds to step 127 since it is necessary to perform an exposure calculation at that step information.

[Step 127] It is determined whether or not the first-stroke switch SW1 is switched on. When switched on, the process proceeds to step 128.

[Step 128] The contents of the register RGAv for diaphragm information and the contents of the register RGBA for bracket steps are added together, and the result is stored again in the register RGAv. Furthermore, the contents of the register RGTv for shutter information and the contents of the register RGBT for bracket steps of the shutter are added together, and the result is stored again in the register RGTv. These procedures indicate that the calculated diaphragm information and the calculated shutter-speed information are changed at the shutter-preference mode and the diaphragm-preference mode, respectively, in accordance with autobracket steps. That is, if autobracket steps are set so as not to become negative numbers at the moment of step 105, the value after the calculation at step 128 becomes an exposure value at the underexposure side relative to a standard exposure. In the manual-exposure mode, since the process passes through step 122 which is identical to the diaphragm-preference mode, the shutter speed is changed, and it becomes possible to perform an autobracket photographing operation which has a constant depth of field and in which only exposure is switched.

On the other hand, when it is determined that the first-stroke switch SW1 is switched off at the above-described step 127, the photometric timer is being operated. Hence, the exposure calculation at step 128 is not performed, but a standard exposure value is displayed at step 129. In this case as well, a first stroke of the shutter-release button 12 is necessarily performed during a photographing operation, the process necessarily passes through step 128. Hence, there exists no problem in an autobracket photographing operation.

As described above, in the autobracket mode, when the first-stroke switch SW1 is switched on, an exposure value in a state in which autobracket functions, that is, an exposure value at the underexposure side in the present embodiment, is displayed, and a standard exposure value is displayed while the photometric timer is operating. The photographer can thereby easily recognize an exposure value in autobracket. Stage:4

[Step 129] The shutter-speed information (the value of the register RGTv), the stop-value information (the value of the register RGAv), step information of autobracket and the like are displayed on the LCD display unit 2.

When the LCDCOM is output from the output port, data are sent to the LCD display circuit 1 via the DBUS, and the LCD display circuit 1 is driven to have the LCD display unit 2 display a predetermined value.

[Step 130] The process returns to the initial step.

[Step 5] It is determined whether the AF-mode switch SWAFM is at the one-shot mode or at the servo mode. In the case of the one-shot mode, when distance measurement is performed with switching on the first-stroke switch SW1, an AF-locking state is provided, and autofocusing operation is not performed until the SW1 is switched off. The process therefore proceeds to step 6.

[Step 6] According to the value of the register RGAv storing the stop-value information, the stop-value information is transmitted to the lens communication circuit 8, which transmits the stop-value information to the lens control circuit 9 by serial communication. The lens control circuit 9 supplies current for the stepping motor M3, and performs driving control for the diaphragm according to the transmitted information. Subsequently, by communication from the microcomputer COM, the lens control circuit 9 stops the current supply to the stepping motor M3. However, the diaphragm blade 530 does not move from the stopped diaphragm due to frictional force and other forces.

[Step 7] A second stroke operation of the shutter-release button 12 is performed, and it is determined whether or not an on-signal for the second-stroke switch SW2 has been input to the input port PA1. If the on-signal for the second-stroke switch SW2 has not been input, the process proceeds to step 8. If an on-signal for the first-stroke switch SW1 has been input at step 8, the process returns to step 4.

[Step 8] If the on-signal for the SW1 has been input to the input port PA0, the process proceeds to step 9.

[Step 9] The photometric timer is reset and started again. It is arranged so that the photometric timer necessarily functions for a predetermined time after the first-stroke switch SW1 has been switched off.

[Step 22] The determination of the switch SWAEL is performed. In the case of AE-locking, the process proceeds to step 7. In the case of no AE-locking, the process proceeds to step 4.

If an on-signal for the second-stroke switch SW2 does not arrive while the switch 1 is kept switched on, the loop step 7→step 8→step 9→step 22→step 7 is continued in the case of AE-locking. During this procedure, a change in photometric value and the like are not accepted, and the diaphragm also remains fixed. In the case of no AE-locking, as long as at the AF-mode switch is on or in the one-shot mode, the loop step 4→step 5→step 6→step 7→step 8→step 9→step 22→step 4 is continued to cycle. During this procedure, a change in photometric value and a change between the autobracket switch and the exposure-mode switch are accepted, data, such as the shutter speed, the stop value and the like, are changed, and the diaphragm is also controlled at a stop value for the changed data.

If an on-signal for the first-stroke switch SW1 does not arrive during this loop, the process proceeds from step 8 to step 121.

Now, when the AF mode is at the one-shot mode, and an on-signal for the switch SW2 is successively input following an on-signal for the switch SW1, the process proceeds from step 7 to step 13, where exposure operation is performed.

[Step 13] It is determined whether or not an on-signal for the self switch SELF has been input to the input port PA6. If an on-signal has been input, the process proceeds to step 14 in order to perform a photographing operation by the self-timer. If an on-signal has not been input, the process proceeds to step 15.

[Step 14] timing of 10 seconds is performed by the self-timer.

Figure 13:
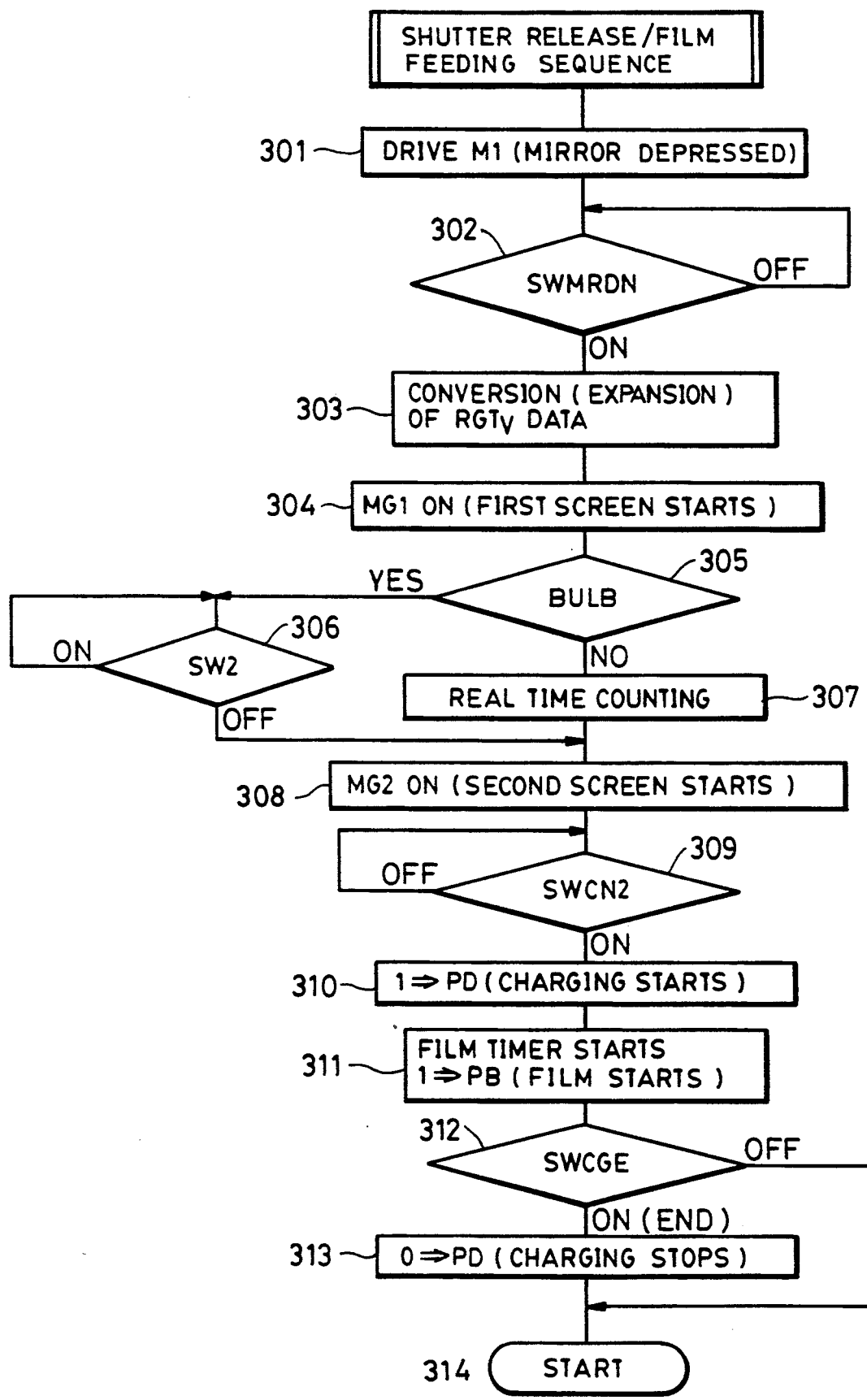
FIG. 13 is a flowchart for explaining the shutter release/feeding sequence.

[Step 15] The shutter-release and film-feeding sequence will be explained with reference to FIG. 13.

The output port PD is set to "1", and the transistor TR3 is turned on to drive the motor M1. The submirror 70 is thereby depressed.

[Step 302] It is determined whether or not an on-signal for the switch SWMRDN for detecting the completion of depressing the submirror has been input to the input port PA2. At this step, the loop is repeated until an on-signal is input, that is, until the submirror is completely depressed. When the submirror is completely depressed, the process proceeds to step 303.

[Step 303] Since the contents of the register RGTv for shutter information are apex values, they are converted (expanded) into real-time data.

[Step 304] A pulse signal is output from the output port PE1, and the transistor TR1 is turned on to supply current for the first-screen magnet MG1. The first screen thereby runs.

[Step 305] It is determined whether or not the contents of the register RGTM are at the bulb mode. If the contents are at the bulb mode, the process proceeds to step 306. If not, the process proceeds to step 307.

[Step 306] The input of an off-signal for the second-stroke switch SW2 is awaited, because the camera is at the bulb mode, and it is necessary to keep the shutter in an open state while an on-signal of the second-stroke switch SW2 is being input.

[Step 307] Since the camera is not at the bulb mode, real-time counting according to data expanded at step 303 is performed, and timing of the calculated shutter-speed time is performed.

[Step 308] When the real-time counting has been completed, a pulse signal is output from the output port PE2, and the transistor TR2 is turned on to supply current for the magnet MG2 for the second screen of the shutter. The second screen of the shutter thereby runs.

[Step 309] It is determined whether or not an on-signal for the switch SWCN2 for the second screen of the shutter is input to the input port PA5. At this step, until an on-signal is input, that is, until running of the second screen of the shutter is completed, the loop is repeated. When completed, the process proceeds to step 310.

[Step 310] The output of the output port PD is set to "1", and the transistor TR3 is turned on to further rotate the motor M1 for raising the submirror and shutter charging.

[Step 311] The timer is started for film feeding. In addition, the output of the output port PC is set to "1", and the transistor TR4 is turned on to rotate the motor M2 for film winding.

[Step 312] When an on-signal for the switch SWCGE for detecting the completion of charging is not input to the input port PA3, that is, when charging is not completed, the process proceeds to step 314. When charging has been completed, the process proceeds to step 313.

[Step 313] Since charging has been completed, the output of the output port PD is set to "0", and current supply for the motor M1 is disconnected.

The process returns to step 16 in FIG. 10.

[Step 16] It is determined whether or not the autobracket mode is set by the state of the flag FABR. If the camera is not at the autobracket mode, the process proceeds to step 20. If at the autobracket mode, the process proceeds to step 17.

[Step 17] It is determined whether or not the autobracket photographing operation has been performed three times. As described above, in the autobracket photographing operation, photographic operations are continuously performed at three-staged exposure values, that is, underexposure, standard and overexposure. Hence, three-time photographic operations are not completed, the process proceeds to step 18.

[Step 18] The contents of the register GRBA for bracket steps of the diaphragm are subtracted from the contents of the register RGAv for diaphragm information, and the result is stored again in the register RGAv. Furthermore, the contents of the register GRBT for bracket steps of the shutter are subtracted from the contents of the register RGTv for shutter-speed information, and the result is stored again in the register RGTv. In this step, the same program may be used for the shutter-preference, diaphragm-preference, and manual-exposure modes such as in step 128 in FIG. 1, because the contents of the registers RGBA and RGBT have been changed at step 119 and step 122. It will be apparent from this calculation formula (subtraction formula) that standard exposure is provided at two photographic operations, and overexposure is provided at a third photographing operation.

Furthermore, data are transmitted to the LCD display circuit 1, and data for the shutter speed and stop value are displayed on the LCD display unit 2.

[Step 19] At the shutter-preference and autobracket modes, the Av value changes at three photographing operations. Hence, diaphragm control is performed at this step. Data of a new stop value are transmitted to the lens control circuit 9 via the lens communication circuit 8. The lens control circuit 9 supplies current for the motor M3 to control the diaphragm without returning the diaphragm to an open state. That is, the operation only for changing from the stopped state at the preceding photographing operation to the stop value for the present photographing operation is performed. Subsequently, the current supply is stopped. In autobracket photographing operations other than at the shutter-preference mode, data of the Av value identical to those for the preceding photographic operation are transmitted to the lens control circuit 9. At this time, the diaphragm is held as it is.

The program then jumps to step 15. That is, the next photographic operation is started, irrespective of the on-or off-state of the second-stroke switch SW2 (irrespective of the generation of the shutter-release signal). In addition, if the photographing operation at this time is at the self timer mode, the next photographic operation is started without operating the self-timer for second and third photographic operations.

When three photographic operations have been completed at the autobracket mode, the process proceeds from step 17 to step 19a.

[Step 19a] Twice the contents of the register GRBA for bracket steps of the diaphragm are added to the contents of the register RGAv for diaphragm information, and the result is stored again in the register RGAv. Furthermore, twice the contents of the register GRBT for bracket steps of the shutter are added to the contents of the register RGTv for shutter-speed information, and the result is stored again in the register RGTv. The result is displayed on the LCD display unit 2 as at step 18. Data immediately before the start of the autobracket photographing operation are thereby stored in the registers RGAv and RGTv.

Subsequently, the process proceeds to step 20, where there is provided a sequence identical to that when a first photographing operation is completed when the camera is not at the autobracket mode.

[Step 20] It is determined whether the camera is at the successive photographing mode or at the single photographing mode from the on- or off-state of the switch SWCS to be input to the input port PA7. In the case of the successive photographing mode and at the same time not at AF-locking, the process returns to step 4, where, as long as the second-stroke switch SW2 is kept in a switched on state, photographing operations are successively performed with accepting changes in photometric value and each switch. However, since the camera is at the AF one-shot mode, distance measurement is not performed except when the first-stroke switch SW1 is depressed for the first time, and AF-locking is performed. Hence, the diaphragm is controlled only at step 6 (controlled also at step 19 at the autobracket mode), and is not returned to an open state during successive photographing operations. If the diaphragm value is changed by the autobracket mode and the like, the diaphragm is controlled by moving the diaphragm blade only by an amount changed.

At the successive photographing mode and AE locking, the process returns to step 7, where, as long as the SW2 is kept switched on, changes in photometric value and each switch are not accepted, and successive photographing operations are performed with the diaphragm kept in a fixed state.

In the case of the single photographing mode, the process proceeds to step 21.

[Step 21] The input of an off-signal for the first-stroke switch SW1 is awaited. Since the camera is at the single photographing mode, the process does not proceeds to the next photographing sequence unless the photographer stops depressing the shutter-release button 12. When an off-signal is input, the process proceeds to step 10.

[Step 10] The diaphragm is returned to an open state (identical to step 2a). The process then returns to the start.

Next, the operation when AF is at the servo mode will be explained.

If AF is at the servo mode and an on-signal for the second-stroke switch SW2 is input following an on-signal for the first-stroke switch SW1, the process proceeds from step 23 to step 26, where a series of exposure operations are performed.

[Steps 26 and 27] As at steps 13 and 14, processing at the self-timer photographing operation is performed.

[Step 28] The same operation as at step 6 is performed. At the servo mode, the diaphragm control is performed after an on-signal for the second-stroke switch SW2 has been input.

[Step 29] The same operation as at step 15 is performed. Shutter release and film feeding sequence is performed.

[Step 30-34] Processing at the autobracket mode is performed by the same operation as at step 16-19a. A distance measurement operation is not performed during the first through third photographing operations at the autobracket mode. The procedure is identical to that when AF is at the one-shot mode.

The process proceeds to step 35 from step 34 when three photographing operations have been performed at the autobracket mode, and from step 30 when one photographic operation has been completed not at the autobracket mode, respectively.

[Step 35] As at step 10, the diaphragm is brought to an open state.

[Step 36] As at step 20, it is determined whether or not the camera is at the successive photographing mode or at the single photographing mode. The process returns to step 2a when the camera is at the successive photographing mode, and proceeds to step 37 when the camera is at the single photographing mode. When the camera is at the AF servo mode and at the successive photographing mode, exposure operation is successively performed as long as the second-stroke switch SW2 is switched on, with necessarily performing distance measurement, the driving of the range ring of the lens and the like immediately before every photographing operation. Every time one photographing operation (three photographing operations at the autobracket mode) is completed, the operation for making the diaphragm in an open state is performed so that distance measurement can be correctly performed.

[Step 37] As at step 21, since the camera is at the single photographing mode, an off-signal for the SW1 is awaited. When an off-signal is input, the process returns to the start.

When a predetermined time does not lapse after the SW1 has been switched off, the photometric timer is functioning, and the process proceeds as step 1→step 11→step 12→step 12a. When the SW1 has been switched off at the oneshot mode, the process proceeds as step 8→ step 12a. When the switch SW1 is switched off and the switch SW2 is switched off at the servo mode, the process proceeds as step 23→step 12a.

[Step 11] It is determined whether or not the photometric timer is in operation.

[Step 12] As at step 4, photometry, display and other operations are performed.

[Step 12a] It is determined whether or not the SWPRE is depressed from the state of the input port PA12. When the SWPRE is depressed, the process proceeds to step 12b.

[Step 12b] The reset and start of the photometric timer is performed (as at step 9).

[Step 12c] Data is transmitted from the microcomputer COM to the lens control circuit 9 via the lens communication circuit 8, and the lens control circuit 9 supplies current for the stepping motor M3 to control the diaphragm. The procedure is identical to that of step 6 up to this point. Subsequently, however, the microcomputer COM does not transmit the communication to stop the current supply for the stepping motor M3. The process then proceeds to step 4. When the SWPRE is not depressed, the process proceeds to steps 12a–12d.

[Step 12d] The diaphragm is moved to an open state (identical to step 2a).

Control of the diaphragm is thereby always performed with supplying current for the stepping motor M3 when the SWPRE is depressed. When the SWPRE is returned, the diaphragm is also returned to an open state.

[Step 12e] Power is turned off, and the process returns to the start.

In the above-described embodiment, the diaphragm is necessarily returned to an open state at the AF servo mode and successive photographing operations. The diaphragm may, however, be returned to a degree which does not influence the distance measurement operation. In the flowchart in FIG. 10, the controls in step 2a and step 35 may be changed from "open diaphragm" to "diaphragm permitting distance measurement".

In the present invention, since the diaphragm is not returned to an open state for every photographing operation at a specific successive photographing operation, it is possible to shorten the time between successive frames, and to provide a sigle-lens reflex camera which can largely reduce power consumption.

Furthermore, in the present invention, since diaphragm control is performed by changing the diaphragm only by a shift amount at a photographing operation in which the diaphragm is automatically shifted, wasteful consumption of power-supply energy is prevented, and it is possible to shorten the time lag between successive frames. In addition, if a semitransparent fixed mirror is used, it is possible to provide a single-lens reflex camera capable of visually confirming how the exposure state changes in accordance with a shift in the diaphragm.

What is claimed is:

1. A camera comprising:
   (a) means for selecting a first photographing mode for performing a second photographing operation at an in-focus lens position used for a first photographing operation;
   (b) means for selecting a second photographing mode for performing autofocusing for every photographing operation, wherein said first and second photographing modes are modes for performing continuous photographing operations; and
   (c) diaphragm control means for controlling the amount of an aperture of a diaphragm, said diaphragm control means maintaining said diaphragm in a state at the first photographing operation when said first photographing mode is selected, and returning said diaphragm to a predetermined position for every photographing operation when said second photographing mode is selected.

2. A camera according to claim 1, wherein said predetermined position represents an open position of said diaphragm.

3. A camera according to claim 1, wherein said means for selecting a second photographing mode for performing autofocusing is capable of selecting between a first autofocusing mode for performing a focusing operation only once for a photographing operation and a second autofocusing mode for performing a focusing operation a plurality of times for a photographing operation.

4. A camera according to claim 3, wherein said first photographing mode can be selected when said first autofocusing mode is selected, and said second photographing mode can be selected when said second autofocusing mode is selected.

5. A camera according to claim 1, wherein said predetermined position represents an aperture position of said diaphragm for enabling autofocusing.

6. A camera according to claim 1, further comprising a motor as a driving source for the opening or closing of said diaphragm.

7. A camera according to claim 1, further comprising an exposure control circuit for controlling exposure by a photometric value for the first photographing operation when said first photographing mode has been selected, and for controlling exposure by performing photometry for every photographic operation when said second photographing mode has been selected.

8. A camera body removably including an interchangeable lens incorporating a diaphragm comprising:
   (a) means for selecting a first photographing mode for performing a second photographing operation at an in-focus lens position used for a first photographing operation;
   (b) means for selecting a second photographing mode for performing autofocusing for every photographing operation, wherein said first and second photographing modes are modes for performing continuous photographing operations; and
   (c) diaphragm control means for controlling the amount of an aperture of a diaphragm within said interchangeable lens, said diaphragm control means maintaining said diaphragm in a state at the first photographing operation when said first photographing mode is selected, and returning said diaphragm to a predetermined position for every photographing operation when said second photographing mode is selected.

9. A camera body according to claim 8, further comprising an exposure control circuit for controlling exposure by a photometric value for the first photographing operation when said first photographing mode has been selected, and for controlling exposure by performing photometry for every photographic operation when said second photographing mode has been selected.

10. A camera body according to claim 8, wherein said predetermined position represents an open position of said diaphragm.

11. A camera body according to claim 8, wherein said means for selecting a second photographing mode for performing autofocusing is capable of selecting between a first autofocusing mode for performing a focusing operation only once for a photographing operation and a second autofocusing mode for performing a focusing operation a plurality of times for a photographing operation.

12. A camera body according to claim 11, wherein said first photographing mode can be selected when said first autofocusing mode is selected, and said second photographing mode can be selected when said second autofocusing mode is selected.

13. A camera body according to claim 8, wherein said predetermined position represents an aperture position of said diaphragm for enabling autofocusing.

* * * * *

UNITED STATES PATENT AND TRADEMARK OFFICE
CERTIFICATE OF CORRECTION

PATENT NO. : 5,140,358

DATED : August 18, 1992   Page 1 of 2

INVENTOR(S) : Tatsuyuki TOKUNAGA, et al.

It is certified that error appears in the above-identified patent and that said Letters Patent is hereby corrected as shown below:

COLUMN 1:

line 28, "can not" should read --cannot--.

COLUMN 3:

line 4, "out" should be deleted.

COLUMN 4:

line 47, "cradles" should read --cradle--.

COLUMN 8:

line 16, "rasing" should read --raising--.

COLUMN 10:

line 65, "springs 384 and 394" should read --springs 384 and 390--.

COLUMN 13:

line 29, "each" (second occurrence) should be deleted.

COLUMN 15:

line 57, "$E_v$is" should read --$E_v$ is--.

UNITED STATES PATENT AND TRADEMARK OFFICE
CERTIFICATE OF CORRECTION

PATENT NO. : 5,140,358
DATED : August 18, 1992
INVENTOR(S) : Tatsuyuki TOKUNAGA, et al.

It is certified that error appears in the above-identified patent and that said Letters Patent is hereby corrected as shown below:

COLUMN 16:

line 13, "interter" should read --inverter--.

COLUMN 18:

line 6, "tramsits" should read --transmits--.

COLUMN 22:

line 14, "Stage: 4" should be a centered sub-heading between lines 14 and 15;
    line 56, "[Step 9" should read --[Step 9]--; and
    line 68, "are" should read --is--.

Signed and Sealed this

Fifth Day of October, 1993

Attest:

BRUCE LEHMAN

Attesting Officer     Commissioner of Patents and Trademarks